(12) United States Patent
Choi et al.

(10) Patent No.: US 12,160,014 B2
(45) Date of Patent: Dec. 3, 2024

(54) ENERGY STORAGE SYSTEM

(71) Applicant: LG ELECTRONICS INC., Seoul (KR)

(72) Inventors: Seongwoo Choi, Seoul (KR); Sungeun Bang, Seoul (KR); Changhyeon Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 162 days.

(21) Appl. No.: 17/546,748

(22) Filed: Dec. 9, 2021

(65) Prior Publication Data

US 2023/0116874 A1    Apr. 13, 2023

(30) Foreign Application Priority Data

Oct. 12, 2021 (KR) .................. 10-2021-0135128

(51) Int. Cl.
| | | |
|---|---|---|
| *H01M 50/262* | (2021.01) | |
| *H01M 10/6563* | (2014.01) | |
| *H01M 50/204* | (2021.01) | |
| *H01M 50/213* | (2021.01) | |
| *H01M 50/242* | (2021.01) | |
| *H01M 50/258* | (2021.01) | |
| *H01M 50/507* | (2021.01) | |

(52) U.S. Cl.
CPC ..... *H01M 50/262* (2021.01); *H01M 10/6563* (2015.04); *H01M 50/204* (2021.01); *H01M 50/213* (2021.01); *H01M 50/242* (2021.01); *H01M 50/258* (2021.01); *H01M 50/507* (2021.01)

(58) Field of Classification Search
CPC .......... H01M 50/262; H01M 10/6563; H01M 50/204; H01M 50/213; H01M 50/242; H01M 50/258; H01M 50/507
See application file for complete search history.

(56) References Cited

FOREIGN PATENT DOCUMENTS

| CN | 207233801 | 4/2018 |
|---|---|---|
| CN | 207781681 | 8/2018 |

(Continued)

OTHER PUBLICATIONS

Machine translation of JP-2016/192335-A, obtained from PE2E (Year: 2016).*

(Continued)

*Primary Examiner* — Haixia Zhang
(74) *Attorney, Agent, or Firm* — LEE, HONG, DEGERMAN, KANG & WAIMEY

(57) ABSTRACT

An energy storage system of the present disclosure includes: a first battery module in which a plurality of battery cells are disposed; a second battery module in which a plurality of battery cells are disposed, and which is disposed to face the first battery module; a module screw which extends in a front-rear direction in which the first battery module and the second battery module are disposed, and fastens the first battery module and the second battery module; an upper fixing bracket which is disposed in an upper side of the first battery module and the second battery module, and fixes the first battery module and the second battery module; and a lower fixing bracket which is disposed in a lower side of the first battery module and the second battery module, and fixes the first battery module and the second battery module.

19 Claims, 32 Drawing Sheets

(56) References Cited

FOREIGN PATENT DOCUMENTS

| CN | 208093630 | 11/2018 | | |
|---|---|---|---|---|
| CN | 110534672 | 12/2019 | | |
| CN | 212648411 | 3/2021 | | |
| DE | 202020103503 U1 | * 9/2021 | .......... | H01M 50/293 |
| JP | 2016192335 A | * 11/2016 | ............. | Y02E 60/10 |

OTHER PUBLICATIONS

Machine translation of DE-2020/20103503-U1, obtained from PE2E (Year: 2021).*

Machine translation of CN-207233801-U, obtained from PE2E (Year: 2018).*

PCT International Application No. PCT/KR2022/009704, International Search Report dated Nov. 7, 2022, 4 pages.

* cited by examiner

ENERGY STORAGE SYSTEM

CROSS-REFERENCE TO RELATED APPLICATIONS

Pursuant to 35 U.S.C. § 119(a), this application claims the benefit of earlier filing date and right of priority to Korean Patent Application No. 10-2021-0135128, filed on Oct. 12, 2021, the contents of which are hereby incorporated by reference herein in its entirety.

BACKGROUND OF THE INVENTION

1. Field of the Invention

The present disclosure relates to an energy storage system, and more particularly, to an energy storage system including a plurality of battery cells.

2. Description of the Related Art

An energy storage system may include a battery pack in which a plurality of battery cells that repeatedly perform charging and discharging are connected in parallel or in series.

The energy storage system may be used as a power source for driving a motor such as an electric bicycle, a scooter, an electric vehicle, a fork lift, an unmanned aerial vehicle, a water vessel, and the like. In addition, the energy storage system may be disposed in a residential space or an office space or work space to store electricity generated in a corresponding space or supply power to a corresponding space.

The energy storage system may include a plurality of battery packs. The plurality of battery packs may include at least one battery module in which a plurality of battery cells are connected in series/parallel. However, in the conventional art, the energy storage system includes a plurality of battery packs, a work error or incorrect installation may occur in the assembly or connection relation of the plurality of battery packs.

A plurality of battery cells electrically connected to each other are disposed inside the battery pack or battery module. Therefore, a stable disposition of the plurality of battery cells is required to maintain an electrical connection relationship between the plurality of battery cells.

A plurality of battery cells disposed inside the battery pack or battery module may be connected in series or in parallel through a plurality of bus bars. However, in the conventional art, since a plurality of bus bars disposed inside the battery pack or battery module are provided to have a plurality of the same shape, there may be restrictions in changing the size of the battery pack or battery module.

In addition, in order to cool the heat generated in the plurality of battery cells disposed inside the battery pack or the battery module, cooling water may be circulated to cool the battery cell. However, in the conventional art, there is a problem that an additional structure for circulating or flowing the cooling water must be disposed.

In addition, when the battery pack is dropped in installation or moving, or an external shock is applied, there may be a problem in the conventional art in that the disposition or connection structure of the battery cells inside the battery pack is damaged.

As an example of the conventional art, Korean Patent Publication No. KR10-2021-0061829 discloses a structure of a battery module including a plurality of battery cells and a battery pack including a plurality of battery modules. However, since the prior document suggests a structure for fixing only the lower side of the battery cell, there is a problem in that the stable disposition of each of the plurality of battery cells is insufficient. In addition, the prior document does not suggest a separate structure for cooling. In addition, when a casing structure of the battery module is a rectangular parallelepiped structure, if an external shock is applied, there is a problem in that the external shock can be transmitted to each of the internal battery cells. In addition, since the bus bar disposed inside the battery module has a straight line shape, it may be difficult to variously change the size of the battery module.

As another example of the conventional art, Korean Patent No. 10-2255633 discloses a battery module including a plurality of battery cells. However, in the prior document, a structure for fixing the upper side of the plurality of battery cells is not separately disclosed. In addition, since the disclosed bus bar has a complicated shape, it is difficult to install, and it is not easy to change the overall size of the battery module. In addition, since it has a structure including a cooling tube for cooling the heat generated in the plurality of battery cells, a cooling material disposed inside the cooling tube is additionally required, and in some cases, a separate additional structure for forming a flow of the cooling material may be required.

In a conventional battery module or a battery pack including the battery module, the number of battery cells connected in parallel and the number of battery cells connected in series may be determined for a required capacity. In addition, since the conventional battery module or the battery pack is disposed in a limited space, it is difficult to vary the disposition of the battery cells as the above mentioned number of the battery cells must be disposed. In particular, since all battery cells connected in parallel must be connected to one bus bar, it is difficult to change the shape of the bus bar or the disposition of the battery cells.

SUMMARY OF THE INVENTION

The present disclosure has been made in view of the above problems, and provides an energy storage system in which coupling force between a plurality of battery modules in which a plurality of battery cells are disposed is strengthened.

The present disclosure further provides an energy storage system for effectively disposing a plurality of battery cells.

The present disclosure further provides an energy storage system having a structure in which a plurality of battery cells are stably disposed.

In accordance with an aspect of the present disclosure, an energy storage system includes: a first battery module in which a plurality of battery cells are disposed: a second battery module in which a plurality of battery cells are disposed, and which is disposed to face the first battery module; a module screw which extends in a front-rear direction in which the first battery module and the second battery module are disposed, and fastens the first battery module and the second battery module: an upper fixing bracket which is disposed in an upper side of the first battery module and the second battery module, and fixes the first battery module and the second battery module; and a lower fixing bracket which is disposed in a lower side of the first battery module and the second battery module, and fixes the first battery module and the second battery module, so that the coupling state of the first battery module and the second battery module can be maintained through a module screw, an upper fixing bracket, and a lower fixing bracket.

Each of the upper fixing bracket and the lower fixing bracket is fastened to each of the first battery module and the second battery module, and the module screw is disposed perpendicular to the upper fixing bracket and the lower fixing bracket, so that the first battery module and the second battery module may be stably coupled.

The energy storage system further includes an insulating plate disposed between the first battery module and the second battery module, and the first battery module and the second battery module are symmetrically disposed with respect to the insulating plate.

Each of the first battery module and the second battery module includes: a plurality of battery cells: a first frame for fixing one side of each of the plurality of battery cells; and a second frame for fixing the other side of each of the plurality of battery cells, wherein the first frame of each of the first battery module and the second battery module is spaced farther from the insulating plate than the second frame of each of the first battery module and the second battery module, wherein a plurality of bus bars for connecting each of the plurality of battery cells in series or in parallel are disposed in the second frame, so that since a plurality of battery cells are connected to an area where the first battery module and the second battery module face each other, heat generated from the battery cells may be discharged to the opposite area.

The module screw connects the first frame of the first battery module and the first frame of the second battery module, so that the entire configuration of the first battery module and the second battery module can be stably coupled through a simple structure.

The first frame included in each of the first battery module and the second battery module comprises a first fastening protrusion protruding in a direction of the second frame disposed adjacently, and the second frame included in each of the first battery module and the second battery module comprises a second fastening protrusion protruding in a direction of the first frame disposed adjacently, wherein the first fastening protrusion and the second fastening protrusion are fixed by a frame screw, so that a fastening force between the first battery module and the second battery module may be strengthened.

The first frame comprises a module fastening protrusion to which the module screw is coupled, and the second frame comprises a support protrusion for supporting the module screw, wherein one side of the module screw is fixed to the module fastening protrusion of the first battery module and the other side is fixed to the module fastening protrusion of the second battery module, so that the entire configuration of the first battery module and the second battery module can be stably coupled through a simple structure.

The module screw includes: a screw header fixed to one of the first battery module and the second battery module; a screw fastening portion fixed to the other one of the first battery module and the second battery module; and a screw support connecting the screw header and the screw fastening portion, wherein the screw support passes through the support protrusion of the second frame, so that the second frame of each of the first battery module and the second battery module may also be fixed.

Each of the upper fixing bracket and the lower fixing bracket is fastened to each of the first frame of the first battery module and the first frame of the second battery module, so that the first battery module and the second battery module may be stably fixed.

The upper fixing bracket includes: an upper board disposed in an upper side of the first battery module and the second battery module: a pair of upper holders extending downward from front and rear end portions of the upper board; and a pair of upper mounters which protrude downward from left and right end portions of the upper board, and are coupled to one side of each of the first battery module and the second battery module, wherein the lower fixing bracket includes: a lower board disposed in a lower side of the first battery module and the second battery module; a pair of lower holders extending upwardly from front and rear end portions of the lower board; and a pair of lower mounters which protrude upward from left and right end portions of the lower board, and are coupled to one side of each of the first battery module and the second battery module, wherein the pair of upper mounters and the pair of lower mounters are respectively fastened to each of the first frame of the first battery module and the first frame of the second battery module, so that front, rear, left, and right directions of the first battery module and the second battery module coupled in the front-rear direction may be fixed. In addition, since the upper board and the lower board fix the upper and lower directions of the first battery module and the second battery module, the first battery module and the second battery module can be fixed in six directions.

A plate groove through which the module screw passes is formed in the insulating plate, so that the disposition of the insulating plate disposed between the first battery module and the second battery module may be maintained.

The energy storage system further includes a pair of side covers which are disposed in both sides of the first battery module and the second battery module, and have a cooling hole formed therein, wherein each of the pair of side covers is fastened to each of the second frame of the first battery module and the second frame of the second battery module, so that a fastening force between the first battery module and the second battery module may be strengthened.

A cooling fan for forming an air flow into the first battery module and the second battery module is disposed in one of the pair of side covers, so that the inside of the battery pack can be cooled by air flow.

The energy storage system further includes a pair of side brackets which are disposed in both sides of the first battery module and the second battery module, and fix a disposition of the first battery module and the second battery module, wherein each of the pair of side brackets is fastened to each of the first frame of the first battery module and the first frame of the second battery module, so that a fastening force between the first battery module and the second battery module may be strengthened.

Each of the pair of side brackets includes: a bracket body having an opening hole formed inside: a pair of bracket sidewalls protruding from both sides of the bracket body toward the first battery module or the second battery module: a bracket top wall protruding from an upper side of the bracket body toward the first battery module or the second battery module; and a shock absorbing portion which is disposed in a lower side of the bracket body, and protrudes to a lower side than the first battery module or the second battery module. The shock absorbing portion protrudes downward from the first battery module or the second battery module, so that the battery cell can be protected even from a fall of the energy storage device.

The opening hole is formed to be larger than the side cover, so that the side cover and side bracket can be separated or coupled separately.

Each of the pair of side brackets protrudes to an upper side and a lower side than the first battery module or the second battery module, so that an external shock generated in the energy storage system may be transmitted to the side bracket.

The energy storage system further includes a top cover which is disposed in an upper side of the upper fixing bracket, and forms a space inside, wherein the top cover is disposed between the pair of side brackets, and disposed to protrude to an upper side than the pair of side brackets, so that a coupling structure of the first battery module and the second battery module may be stacked.

A height at which the pair of side brackets protrude downward from the first battery module or the second battery module is formed to be longer than a height at which the top cover protrudes from an upper end of the side cover, so that even if the coupling structure of the first battery module and the second battery module is stacked in the vertical direction, it may have a structure of being contacted through the side bracket. External impact, or the like can be transmitted only to the side bracket.

The details of other embodiments are included in the detailed description and drawings.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION OF THE PREFERRED EMBODIMENTS

Figure 1:
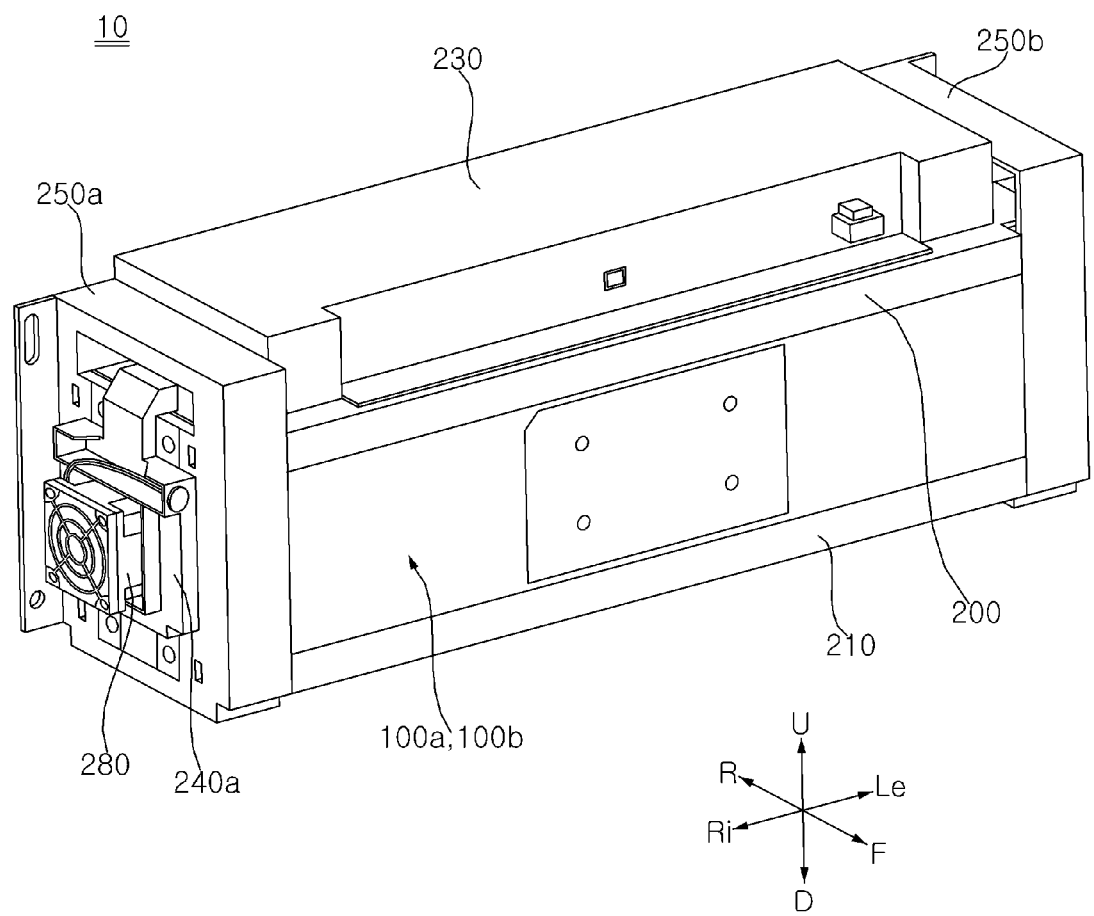
FIG. 1 is a perspective view of a battery pack according to an embodiment of the present disclosure.

Advantages and features of the present disclosure and methods of achieving them will become apparent with reference to the embodiments described below in detail in conjunction with the accompanying drawings. However, the present disclosure is not limited to the embodiments disclosed below, but may be implemented in various different forms, and these embodiments are provided only to allow the disclosure of the present disclosure to be complete, and to completely inform those of ordinary skill in the art to which the present disclosure belongs, the scope of the invention, and the present disclosure is only defined by the scope of the claims. Like reference numerals refer to like elements throughout.

The top U, bottom D, left Le, right Ri, front F, and rear R used in FIGS. 1 to 2, and FIGS. 9 to 27 are used to describe a battery pack and an energy storage system including a battery pack, and may be set differently according to standard.

The height direction (h+, h−), length direction (l+, l−), and width direction (w+, w−) of the battery module used in FIGS. 3 to 8 are used to describe the battery module, and may be set differently according to standard.

Hereinafter, the present disclosure will be described with reference to the drawings for explaining an energy storage system according to embodiments of the present disclosure.

<Overall Configuration>

The energy storage system of the present disclosure may include a battery pack in which a plurality of battery cells are connected in series and in parallel. The energy storage system may include a plurality of battery packs.

Figure 2:
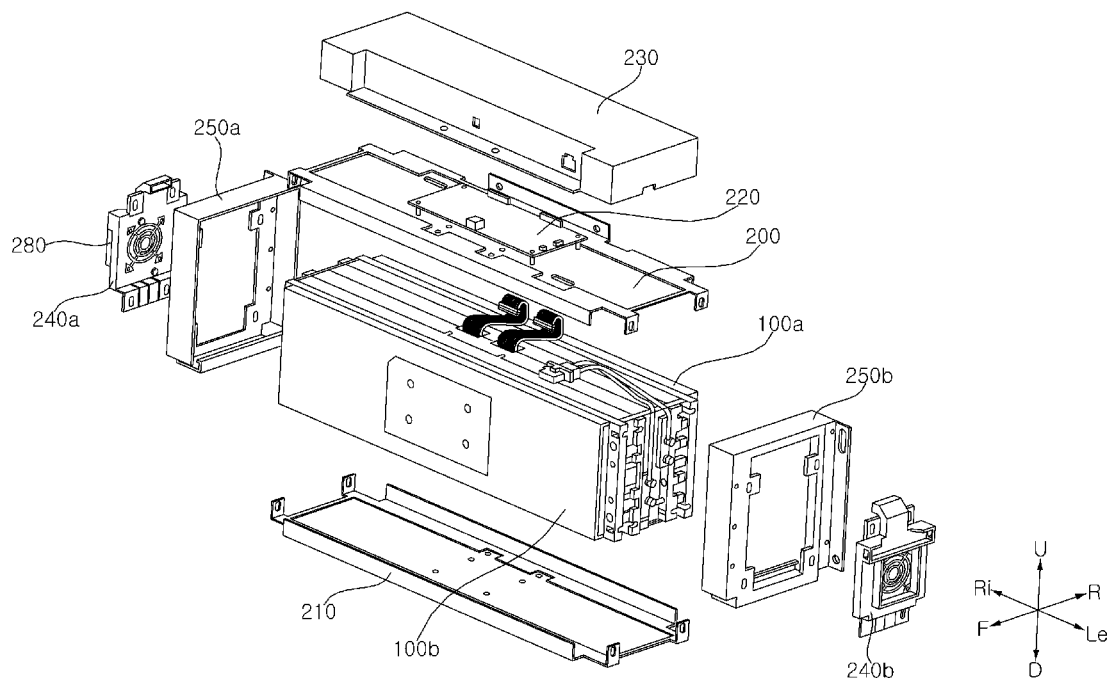
FIG. 2 is an exploded view of a battery pack according to an embodiment of the present disclosure.
Figure 3:
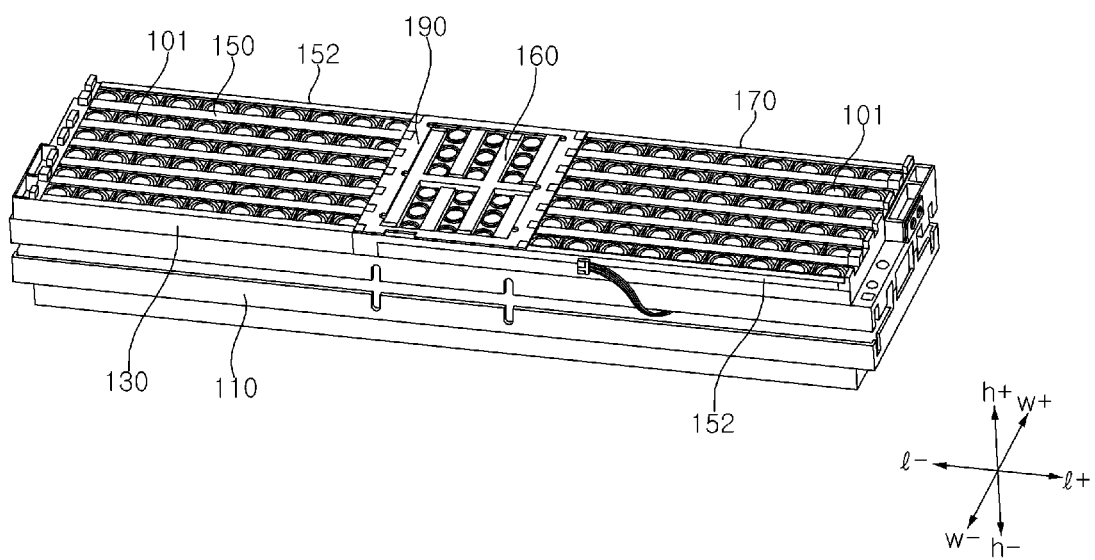
FIG. 3 is a perspective view of a battery module according to an embodiment of the present disclosure.
Figure 4:
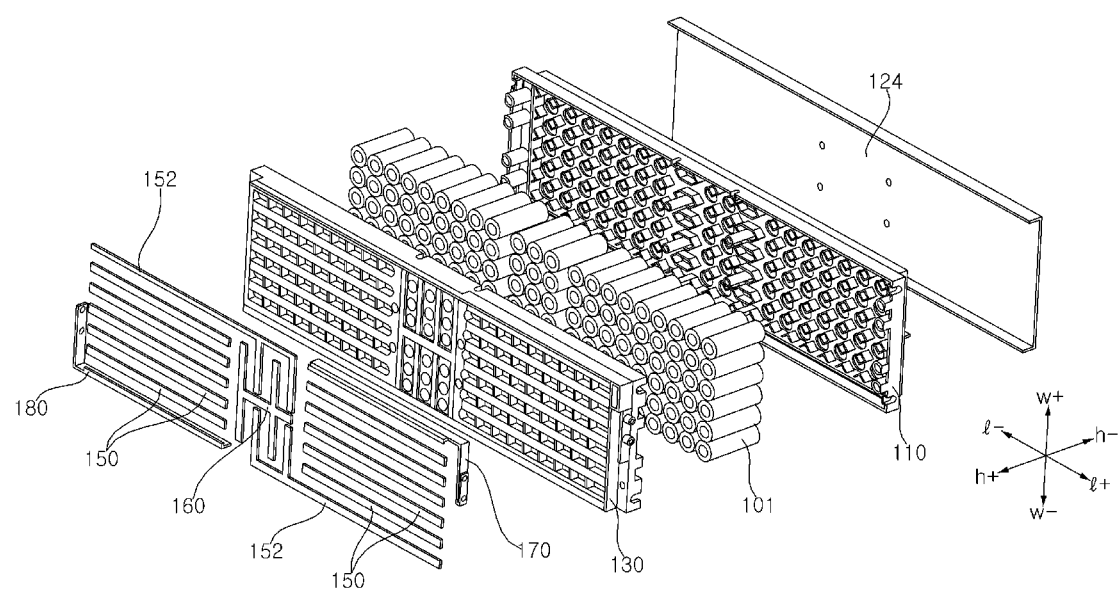
FIG. 4 is an exploded view of a battery module according to an embodiment of the present disclosure.

First, a configuration of one battery pack 10 will be described with reference to FIGS. 1 to 2.

The battery pack 10 includes at least one battery module 100*a*, 100*b* to which a plurality of battery cells 101 (FIG. 3) are connected in series and/or parallel, an upper fixing bracket 200 which is disposed in an upper portion of the battery module 100*a*, 100*b* and fixes the disposition of the battery module 100*a*, 100*b*, a lower fixing bracket 210 which is disposed in a lower portion of the battery module 100 and fixes the disposition of the battery modules 100*a* and 100*b*, a pair of side brackets 250*a*, 250*b* which are disposed in both side surfaces of the battery module 100*a*, 100*b* and fixes the disposition of the battery module 100*a*, 100*b*, a pair of side covers 240*a*, 240*b* which are disposed in both side surfaces of the battery module 100*a*, 100*b*, and in which a cooling hole 242*a* (FIG. 15) is formed, a cooling fan 280 which is disposed in one side surface of the battery module 100*a*, 100*b* and forms an air flow inside the battery module 100*a*, 100*b*, a battery pack circuit substrate 220 which is disposed in the upper side of the upper fixing bracket 200 and collects sensing information of the battery module 100*a*, 100*b*, and a top cover 230 which is disposed in the upper side of the upper fixing bracket 200 and covers the upper side of the battery pack circuit substrate 220.

The battery pack 10 includes at least one battery module 100*a*, 100*b*. Referring to FIG. 2, the battery pack 10 of the present disclosure includes a battery module assembly 100 configured of two battery modules 100*a*, 100*b* which are electrically connected to each other and physically fixed. The battery module assembly 100 includes a first battery module 100*a* and a second battery module 100*b* disposed to face each other.

Hereinafter, the first battery module 100*a* of the present disclosure will be described with reference to FIGS. 3 to 8. The configuration and shape of the first battery module 100*a* described below may also be applied to the second battery module 100*b*.

The battery module described in FIGS. 3 to 8 may be described in a vertical direction based on the height direction (h+, h−) of the battery module. The battery module described in FIGS. 3 to 8 may be described in the left-right direction based on the length direction (l+, l−) of the battery module. The battery module described in FIGS. 3 to 8 may be described in the front-rear direction based on the width direction (w+, w−) of the battery module. The direction setting of the battery module used in FIGS. 3 to 8 may be different from the direction setting in a structure of the battery pack 10 described in other drawings. In the battery module described in FIGS. 3 to 8, the width direction (w+, w−) of the battery module may be described as a first direction, and the length direction (l+, l−) of the battery module may be described as a second direction.

The first battery module 100*a* (FIG. 2) includes a plurality of battery cells 101, a first frame 110 for fixing the lower portion of the plurality of battery cells 101, a second frame 130 for fixing the upper portion of the plurality of battery cells 101, a heat dissipation plate 124 which is disposed in the lower side of the first frame 110 and dissipates heat generated from the battery cell 101, a plurality of bus bars (e.g., first bus bar 150, second bus bar 152) which are disposed in the upper side of the second frame 130 and electrically connect the plurality of battery cells 101, and a sensing substrate 190 which is disposed in the upper side of the second frame 130 and detects information of the plurality of battery cells 101.

The first frame 110 and the second frame 130 may fix the disposition of the plurality of battery cells 101. In the first frame 110 and the second frame 130, the plurality of battery cells 101 are disposed to be spaced apart from each other. Since the plurality of battery cells 101 are spaced apart from each other, air may flow into a space between the plurality of battery cells 101 by the operation of the cooling fan 280 described below.

The first frame 110 fixes the lower end of the battery cell 101. The first frame 110 includes a lower plate 112 having a plurality of battery cell holes 112*a* formed therein, a first fixing protrusion 114 which protrudes upward from the upper surface of the lower plate 112 and fixes the disposition of the battery cell 101, a pair of first sidewalls 116 which protrudes upward from both ends of the lower plate 112, and a pair of first end walls 118 which protrudes upward from both ends of the lower plate 112 and connects both ends of the pair of first side walls 116.

The pair of first sidewalls 116 may be disposed parallel to a first cell array 102 described below. The pair of first end walls 118 may be disposed perpendicular to the pair of first side walls 116.

Figure 5:
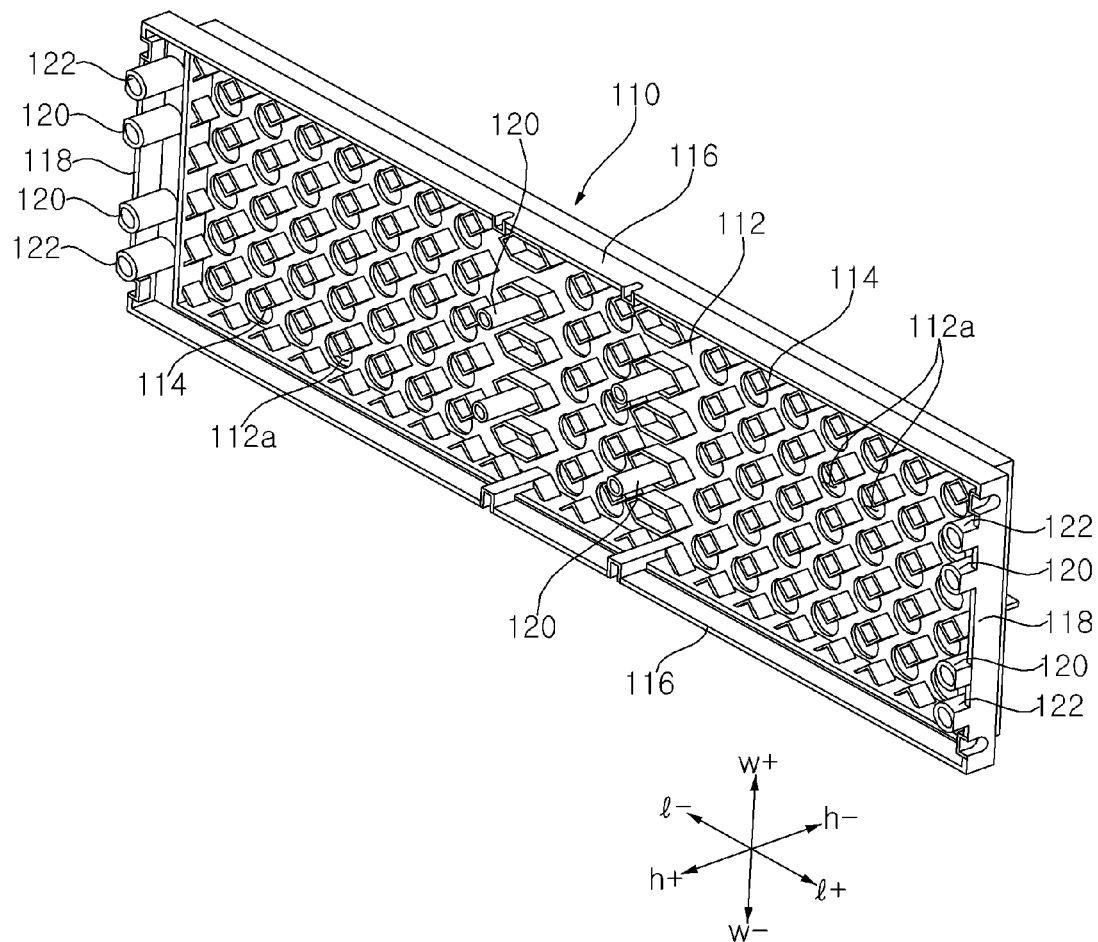
FIG. 5 is a perspective view of a first frame of a battery module according to an embodiment of the present disclosure.

Referring to FIG. 5, the first frame 110 includes a first fastening protrusion 120 protruding to be fastened to the second frame 130, and a module fastening protrusion 122 protruding to be fastened with the first frame 110 included in the second battery module 100*b* disposed adjacently. A frame screw 125 (FIG. 12) for fastening the second frame 130 and the first frame 110 is disposed in the first fastening protrusion 120. A module screw 194 (FIG. 9) for fastening the first battery module 100*a* and the second battery module 100*b* is disposed in the module fastening protrusion 122. The frame screw 125 fastens the second frame 130 and the first frame 110. The frame screw 125 may fix the disposition of the plurality of battery cells 101 by fastening the second frame 130 and the first frame 110.

The heat dissipation plate 124 is disposed the lower side of the first frame 110. The heat dissipation plate 124 may be formed of an aluminum material. Other materials are within scope of the present invention. The heat dissipation plate 124 may be disposed in contact with the lower end of each of the plurality of battery cells 101. The heat dissipation plate 124 may be adhered to the lower end of the plurality of battery cells 101 through a conductive adhesive solution. The conductive adhesive solution may be a bonding solution containing alumina. Other adhesive materials are within scope of the present invention. The conductive adhesive solution may fix the heat dissipation plate 124 disposed in the lower portion of the battery cell 101, and transfer heat generated from the battery cell 101 to the heat dissipation plate 124.

Figure 6:
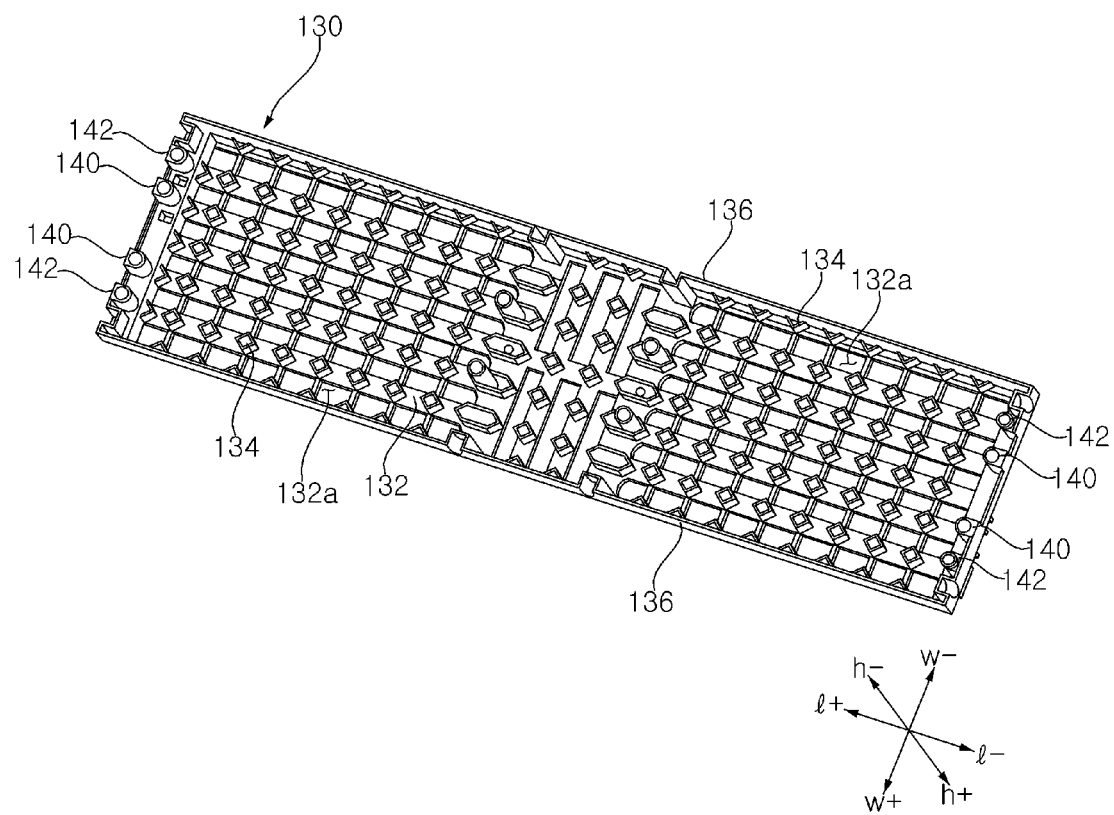
FIG. 6 is a perspective view of a second frame of a battery module according to an embodiment of the present disclosure.

Referring to FIG. 6, the second frame 130 fixes the upper end portion of the battery cell 101. The second frame 130 includes an upper plate 132 that forms a surface on which the bus bar (e.g., first bus bar 150, second bus bar 152) is mounted, and has a plurality of connection holes 132*a* formed to open the upper side of the plurality of battery cells 101 between the surfaces on which the bus bar (e.g., first bus bar 150, second bus bar 152) is mounted, a second fixing protrusion 134 that protrudes to the lower side of the upper plate 132 and fixes the disposition of the plurality of battery cells 101, a pair of second side walls 136 protruding downward from both side ends of the upper plate 132, and a pair of second end walls 138 that protrude downward from both ends of the upper plate 132 and connect both ends of the pair of second side walls 136.

Figure 12:
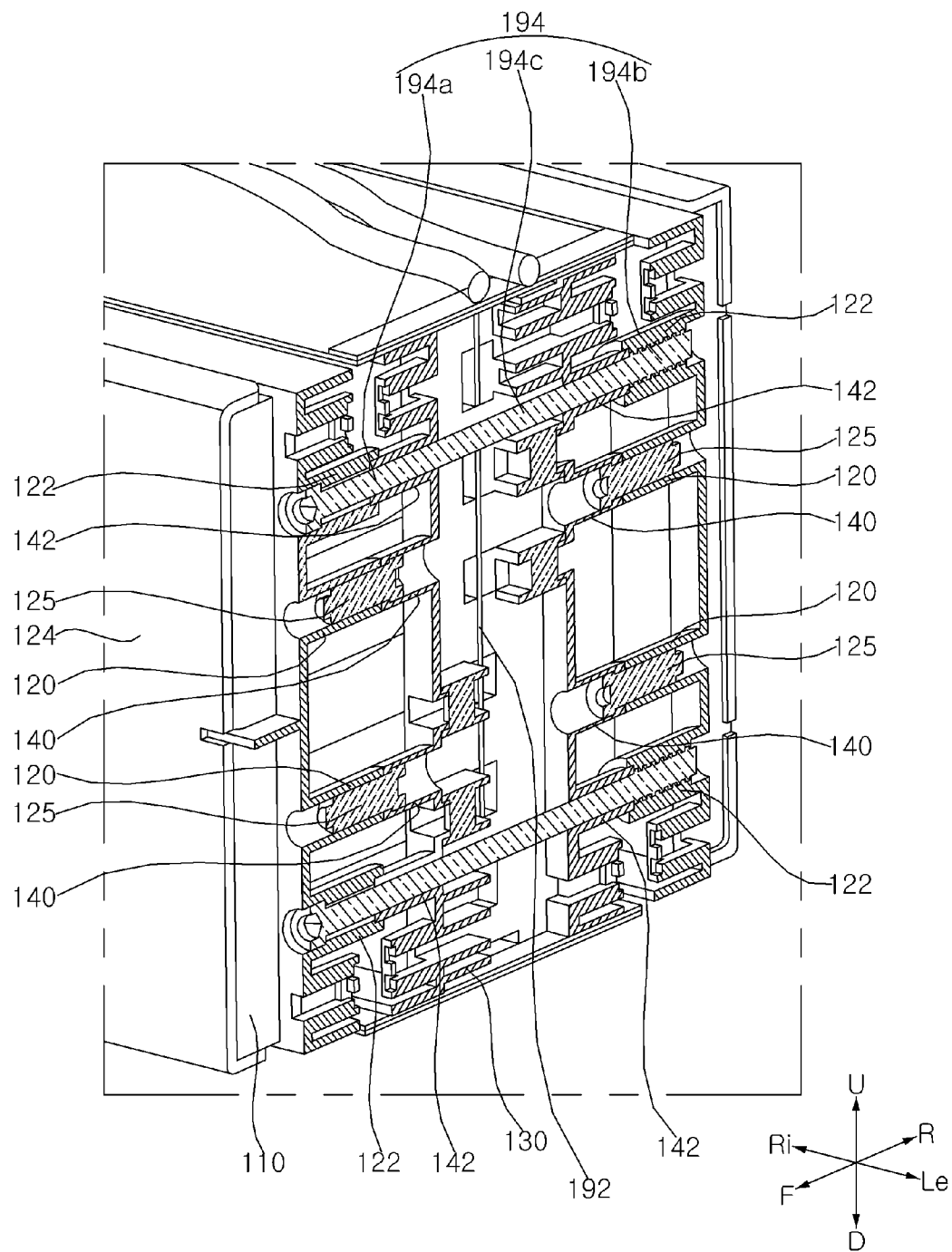
FIG. 12 is a view for explaining a module screw for coupling a first battery module and a second battery module according to an embodiment of the present disclosure.

The second frame 130 includes a second fastening protrusion 140 protruding to be fastened to the first frame, and a support protrusion 142 for supporting the module screw 194 (FIG. 12).

Figure 8:
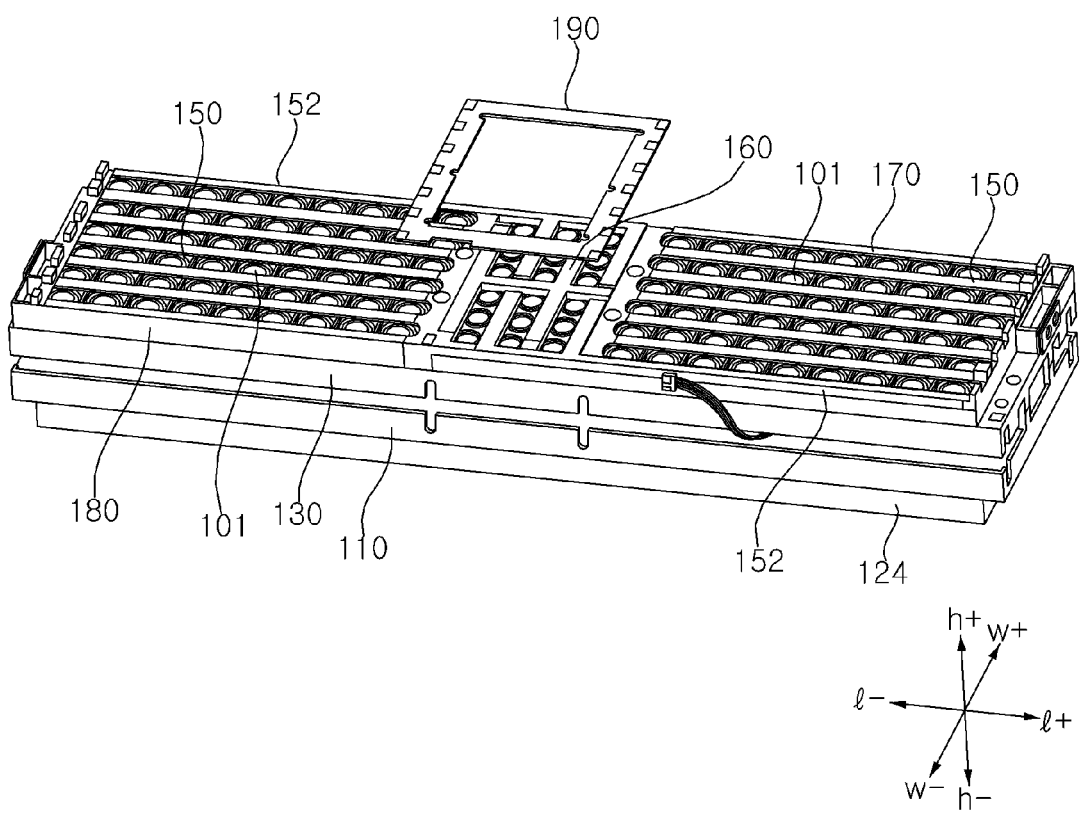
FIG. 8 is an exploded perspective view of a battery module and a sensing substrate according to an embodiment of the present disclosure.
Figure 9:
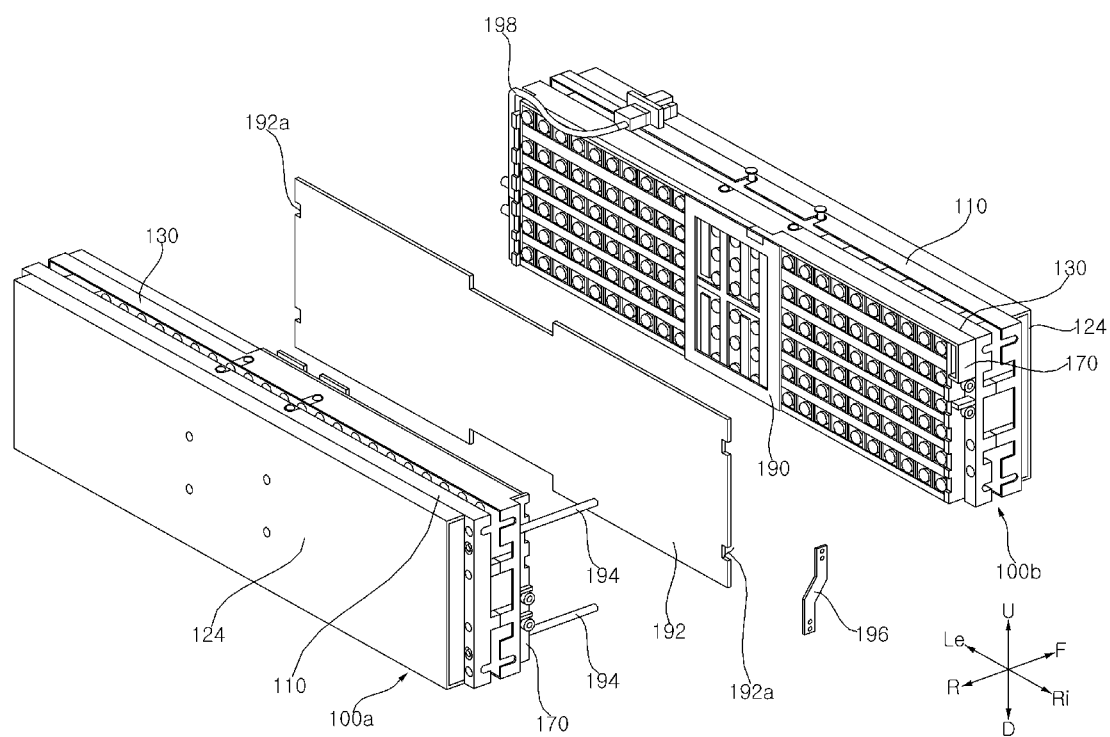
FIG. 9 is an exploded perspective view of a first battery module, a second battery module, and an insulating plate according to an embodiment of the present disclosure.
Figure 10:
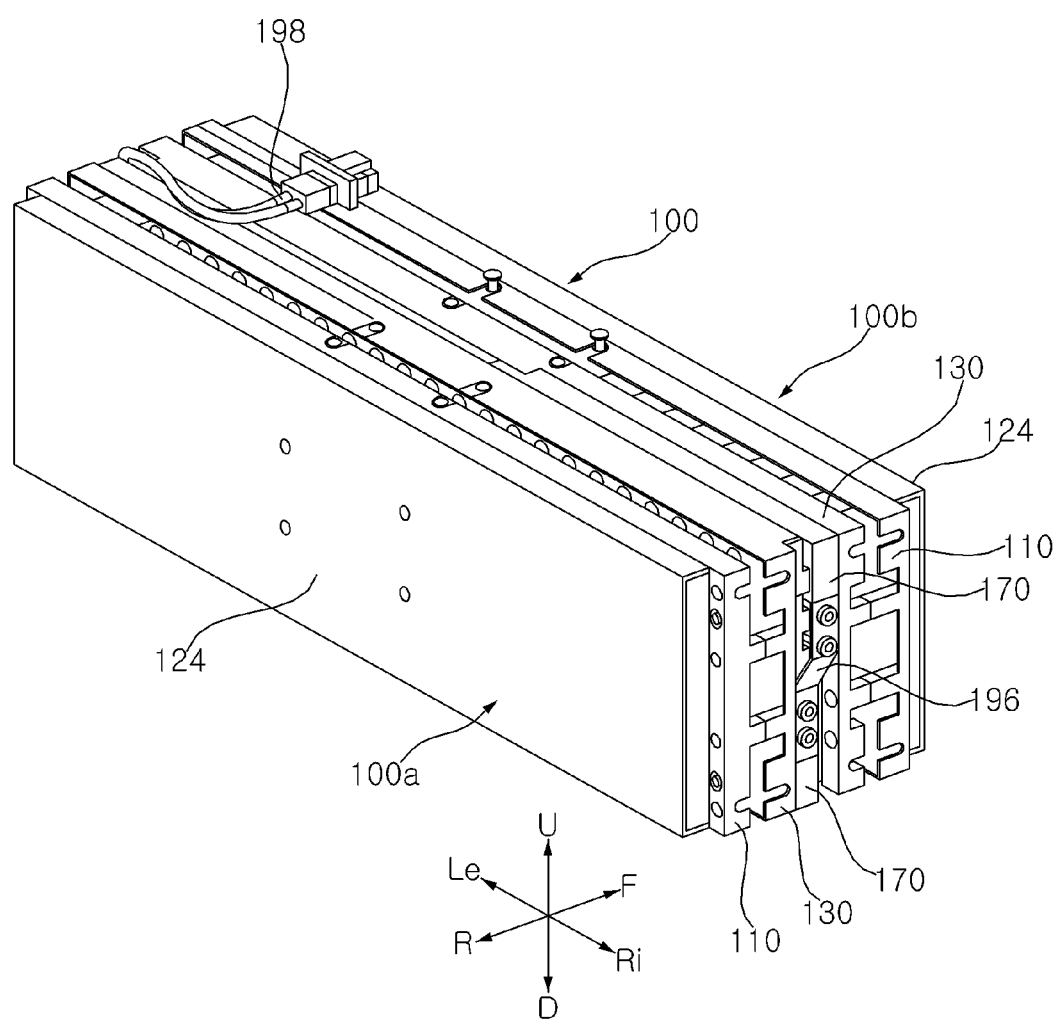
FIG. 10 is a coupling perspective view of a first battery module, a second battery module, and an insulating plate according to an embodiment of the present disclosure.

Referring to FIG. 8, in a state in which the second frame 130 and the first frame 110 are coupled, the second sidewall 136 and the first sidewall 116 are vertically spaced apart from each other. Accordingly, a space in which air flows may be formed between the second sidewall 136 and the first sidewall 116. That is, the battery cell 101 disposed adjacent to the second sidewall 136 and the first sidewall 116 may be cooled by the air flowing into the space formed between the second sidewall 136 and the first sidewall 116.

The plurality of battery cells 101 are fixedly disposed in the second frame 130 and the first frame 110. A plurality of battery cells 101 are disposed in series and parallel. The plurality of battery cells 101 are fixedly disposed by a first fixing protrusion 114 of the first frame 110 and a second fixing protrusion 134 of the second frame 130.

Figure 7:
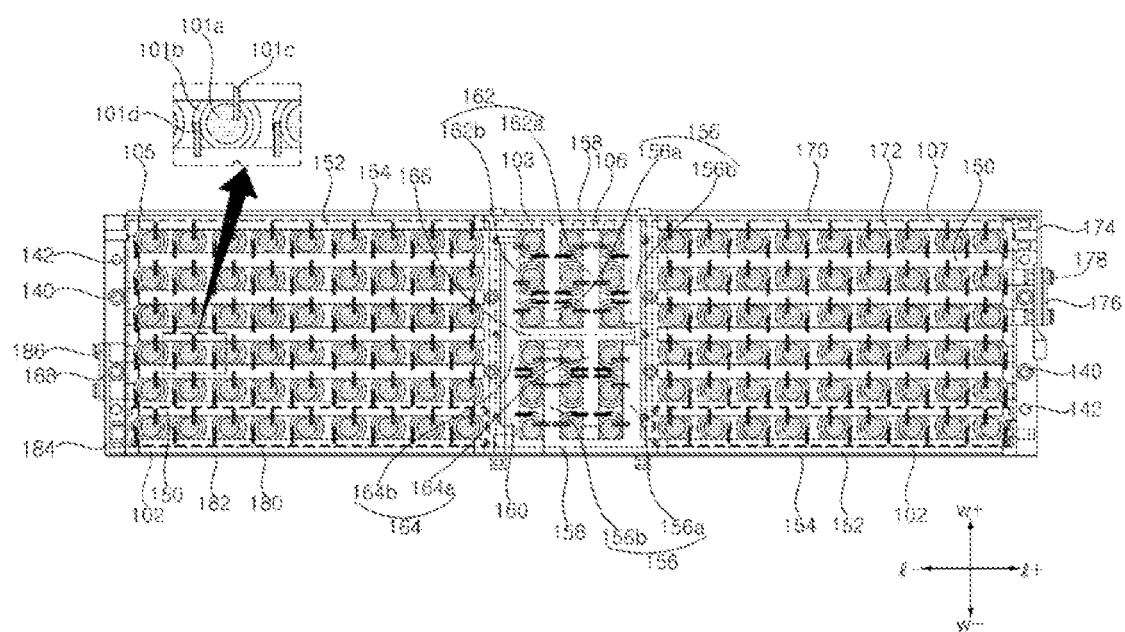
FIG. 7 is a front view of a battery module according to an embodiment of the present disclosure.

Referring to FIG. 7, the plurality of battery cells 101 are spaced apart from each other in the length direction (l+, l−) and the width direction (w+, w−) of the battery module.

The plurality of battery cells 101 includes a cell array connected in parallel to one bus bar (e.g., first bus bar 150, second bus bar 152). The cell array may refer to a set electrically connected in parallel to one bus bar (e.g., first bus bar 150, second bus bar 152).

The first battery module 100*a* may include a plurality of cell arrays 102 and 103 electrically connected in series. The plurality of cell arrays 102 and 103 are electrically connected to each other in series. The first battery module 100*a* has a plurality of cell arrays 102 and 103 connected in series.

The plurality of cell arrays 102 and 103 may include a first cell array 102 in which a plurality of battery cells 101 are disposed in a straight line, and a second cell array 103 in which a plurality of cell array rows and columns are disposed.

The first battery module 100*a* may include a first cell array 102 in which a plurality of battery cells 101 are disposed in a straight line, and a second cell array 103 in which a plurality of rows and columns are disposed.

Referring to FIG. 7, in the first cell array 102, a plurality of battery cells 101 are disposed in the left and right side in the length direction (l+, l−) of the first battery module 100*a*. The plurality of first cell arrays 102 are disposed in the front and rear side in the width direction (w+, w−) of the first battery module 100*a*.

Referring to FIG. 7, the second cell array 103 includes a plurality of battery cells 101 spaced apart from each other in the width direction (w+, w−) and the length direction (l+, l−) of the first battery module 100*a*.

The first battery module 100*a* includes a first cell group 105 in which a plurality of first cell arrays 102 are disposed in parallel, and a second cell group 106 that includes at least one second cell array 103 and is disposed in one side of the first cell group 105.

The first battery module 100*a* includes a first cell group 105 in which a plurality of first cell arrays 102 are connected in series, and a third cell group 107 in which a plurality of first cell arrays 102 are connected in series, and which are spaced apart from the first cell group 105. The second cell group is disposed between the first cell group 105 and the third cell group 107.

In the first cell group 105, a plurality of first cell arrays 102 are connected in series. In the first cell group 105, a plurality of first cell arrays 102 are spaced apart from each other in the width direction of the battery module. The plurality of first cell arrays 102 included in the first cell group 105 are spaced apart in a direction perpendicular to the direction in which the plurality of battery cells 101 included in each of the first cell arrays 102 are disposed.

Referring to FIG. 7, nine battery cells 101 connected in parallel are disposed in each of the first cell array 102 and the second cell array 103.

Referring to FIG. 7, in the first cell array 102, nine battery cells 101 are spaced apart from each other in the length direction of the battery module. In the second cell array 103, nine battery cells are spaced apart from each other in a plurality of rows and a plurality of columns. Referring to FIG. 7, in the second cell array 103, three battery cells 101 that are spaced apart from each other in the width direction of the battery module are spaced apart from each other in the length direction of the battery module. Here, the length direction (l+, l−) of the battery module may be set as a column direction, and the width direction (w+, w−) of the battery module may be set as a row direction.

Referring to FIG. 7, each of the first cell group 105 and the third cell group 107 is disposed such that six first cell arrays 102 are connected in series. In each of the first cell group 105 and the third cell group 107, six first cell arrays 102 are spaced apart from each other in the width direction of the battery module.

Referring to FIG. 7, the second cell group 106 includes two second cell arrays 103. The two second cell arrays 103 are spaced apart from each other in the width direction of the battery module. The two second cell arrays 103 are connected in parallel to each other. Each of the two second cell arrays 103 is disposed symmetrically with respect to the horizontal bar 166 of a third bus bar 160 described below.

The first battery module 100*a* includes a plurality of bus bars which are disposed between the plurality of battery cells 101, and electrically connect the plurality of battery cells 101. Each of the plurality of bus bars connects in parallel the plurality of battery cells included in a cell array disposed adjacent to each other. Each of the plurality of bus bars may connect in series two cell arrays disposed adjacent to each other.

The plurality of bus bars includes a first bus bar 150 connecting the two first cell arrays 102 in series, a second bus bar 152 connecting the first cell array 102 and the second cell array 103 in series, and a third bus bar 160 connecting the two second cell arrays 103 in series.

The plurality of bus bars include a fourth bus bar 170 connected to one first cell array 102 in series. The plurality of bus bars include a fourth bus bar 170 which is connected to one first cell array 102 in series and connected to other battery module 100*b* included in the same battery pack 10, and a fifth bus bar 180 which is connected to one first cell array 102 in series and connected to one battery module included in other battery pack 10. The fourth bus bar 170 and the fifth bus bar 180 may have the same shape.

The first bus bar 150 is disposed between two first cell arrays 102 spaced apart from each other in the length direction of the battery module. The first bus bar 150 connects in parallel a plurality of battery cells 101 included in one first cell array 102. The first bus bar 150 connects in series the two first cell arrays 102 disposed in the length direction (l+, l−) of the battery module.

Referring to FIG. 7, a positive terminal 101*a* of each of the battery cells 101 of the first cell array 102 which is disposed in the front in the width direction (w+, w−) of the battery module with respect to the first bus bar 150 is electrically connected to a negative terminal 101*b* of each of the battery cells 101 of the first cell array 102 which is disposed in the rear in the width direction (w+, w−) of the battery module with respect to the first bus bar 150.

Referring to FIG. 7, in the battery cell 101, the positive terminal 101*a* and the negative terminal 101*b* are partitioned in the upper end thereof. In the battery cell 101, the positive terminal 101*a* is disposed in the center of a top surface formed in a circle, and the negative terminal 101*b* is disposed in the circumference portion of the positive terminal 101*a*. Each of the plurality of battery cells 101 may be connected to each of the plurality of bus bars through a cell connector 101*c*, 101*d*.

The first bus bar 150 has a straight bar shape. The first bus bar 150 is disposed between the two first cell arrays 102. The first bus bar 150 is connected to the positive terminal of the plurality of battery cells 101 included in the first cell array 102 disposed in one side, and is connected to the negative terminal of the plurality of battery cells 101 included in the first cell array 102 disposed in the other side.

The first bus bar 150 is disposed between the plurality of first cell arrays 102 disposed in the first cell group 105 and the third cell group 107.

The second bus bar 152 connects the first cell array 102 and the second cell array 103 in series. The second bus bar 152 includes a first connecting bar 154 connected to the first cell array 102 and a second connecting bar 156 connected to the second cell array 103. The second bus bar 152 is disposed perpendicular to the first connecting bar 154. The second bus bar 152 includes an extension portion 158 that extends from the first connecting bar 154 and is connected to the second connecting bar 156.

The first connecting bar 154 may be connected to different electrode terminals of the second connecting bar 156 and the battery cell. Referring to FIG. 7, the first connecting bar 154 is connected to the positive terminal 101*a* of the battery cell 101 included in the first cell array 102, and the second connecting bar 156 is connected to the negative terminal 101*b* of the battery cell 101 included in the second cell array 103. However, this is just an embodiment and it is possible to be connected to opposite electrode terminal.

The first connecting bar 154 is disposed in one side of the first cell array 102. The first connecting bar 154 has a straight bar shape extending in the length direction of the battery module. The extension portion 158 has a straight bar shape extending in the direction in which the first connecting bar 154 extends.

The second connecting bar 156 is disposed perpendicular to the first connecting bar 154. The second connecting bar 156 has a straight bar shape extending in the width direction (w+, w−) of the battery module. The second connecting bar 156 may be disposed in one side of the plurality of battery cells 101 included in the second cell array 103. The second connecting bar 156 may be disposed between the plurality of battery cells 101 included in the second cell array 103. The second connecting bar 156 extends in the width direction (w+, w−) of the battery module, and is connected to the battery cell 101 disposed in one side or both sides.

The second connecting bar 156 includes a second-first connecting bar 156*a* and a second-second connecting bar 156*b* spaced apart from the second-first connecting bar 156*a*. The second-first connecting bar 156*a* is disposed between the plurality of battery cells 101, and the second-second connecting bar 156*b* is disposed in one side of the plurality of battery cells 101.

The third bus bar 160 connects in series the two second cell arrays 103 spaced apart from each other. The third bus bar 160 includes a first vertical bar 162 connected to one cell array among the plurality of second cell arrays 103, a second vertical bar 164 connected to the other cell array among the plurality of second cell arrays 103, and a horizontal bar 166 which is disposed between the plurality of second cell arrays 103 and connected to the first vertical bar 162 and the second vertical bar 164. The first vertical bar 162 and the second vertical bar 164 may be symmetrically disposed with respect to the horizontal bar 166.

A plurality of first vertical bars 162 may be disposed to be spaced apart from each other in the length direction (l+, l−) of the battery module. Referring to FIG. 7, the first vertical bar 162 may include a first-first vertical bar 162*a*, and a first-second vertical bar 162*b* spaced apart from the first-first vertical bar 162*a* in the length direction of the battery module.

A plurality of second vertical bars 164 may be disposed to be spaced apart from each other in the length direction (l+, l−) of the battery module. Referring to FIG. 7, a second-first vertical bar 164*a*, and a second-second vertical bar 164*b* which is spaced apart from the second-first vertical bar 164*a* in the length direction of the battery module may be included.

The first vertical bar 162 or the second vertical bar 164 may be disposed parallel to the second connecting bar 156 of the second bus bar 152. The battery cell 101 included in the second cell array 103 may be disposed between the first vertical bar 162 and the second connecting bar 156. Similarly, the battery cell 101 included in the second cell array 103 may be disposed between the second vertical bar 164 and the second connecting bar 156.

The first battery module 100*a* includes a fourth bus bar 170 connected to the second battery module 100*b* included in the same battery pack 10, and a fifth bus bar 180 connected to one battery module included in other battery pack 10.

The fourth bus bar 170 is connected to the second battery module 100*b* which is another battery module included in the same battery pack 10. That is, the fourth bus bar 170 is connected to the second battery module 100*b* included in the same battery pack 10 through a high current bus bar 196 described below.

The fifth bus bar 180 is connected to other battery pack 10. That is, the fifth bus bar 180 may be connected to a battery module included in other battery pack 10 through a power line 198 described below.

The fourth bus bar 170 includes a cell connecting bar 172 which is disposed in one side of the first cell array 102, and connects in parallel the plurality of battery cells 101 included in the first cell array 102, and an additional connecting bar 174 which is vertically bent from the cell connecting bar 172 and extends along the end wall of the second frame 130.

The cell connecting bar 172 is disposed in the second sidewall 136 of the second frame 130. The cell connecting bar 172 may be disposed to surround a portion of the outer circumference of the second sidewall 136. The additional connecting bar 174 is disposed outside the second end wall 138 of the second frame 130.

The additional connecting bar 174 includes a connecting hanger 176 to which the high current bus bar 196 is connected. The connecting hanger 176 is provided with a groove 178 opened upward. The high current bus bar 196 may be seated on the connecting hanger 176 through the groove 178. The high current bus bar 196 may be fixedly disposed in the connecting hanger 176 through a separate fastening screw while seated on the connecting hanger 176.

The fifth bus bar 180 may have the same configuration and shape as the fourth bus bar. That is, the fifth bus bar 180 includes a cell connecting bar 182 and an additional connecting bar 184. The additional connecting bar 184 of the fifth bus bar 180 includes a connecting hanger 186 to which a terminal 198a of the power line 198 is connected. The connecting hanger 186 is provided with a groove 188 into which the terminal 198a of the power line 198 is inserted.

As seen in FIG. 8, the sensing substrate 190 is electrically connected to a plurality of bus bars disposed inside the first battery module 100a. However, other shapes are possible. The sensing substrate 190 may be electrically connected to each of the plurality of first bus bars 150, the plurality of second bus bars 152, the third bus bar 160, and the plurality of fourth bus bars 170, respectively. The sensing substrate 190 is connected to each of the plurality of bus bars, so that information such as voltage and current values of the plurality of battery cells 101 included in the plurality of cell arrays can be obtained.

The sensing substrate 190 may have a rectangular ring shape. The sensing substrate 190 may be disposed between the first cell group 105 and the third cell group 107. The sensing substrate 190 may be disposed to surround the second cell group 106. The sensing substrate 190 may be disposed to partially overlap the second bus bar 152.

<Coupling of Battery Module Assembly>

The battery module assembly 100 described in FIGS. 9 to 27 may mean a state in which the first battery module 100a and the second battery module 100b are coupled. In addition, the battery module 100a, 100b described in FIGS. 9 to 27 may mean a state in which the first battery module 100a and the second battery module 100b are coupled, or may mean any one of the first battery module 100a and the second battery module 100b. In FIGS. 9 to 27, the directions of up U, down D, left Le, right Ri, front F, and rear R may be described based on the direction setting shown in the drawing.

Hereinafter, the disposition and connection relationship of a pair of battery modules 100a and 100b included in the battery pack 10 will be described with reference to FIGS. 9 to 12.

The battery pack 10 includes a pair of battery modules 100a and 100b disposed to face each other. The pair of battery modules 100a and 100b are connected to each other in series, and may constitute one battery module assembly 100. The battery module assembly 100 includes a first battery module 100a and a second battery module 100b disposed to face the first battery module 100a.

The battery pack 10 includes a first battery module 100a and a second battery module 100b disposed to face the first battery module 100a. The battery pack 10 includes an insulating plate 192 which is disposed between the first battery module 100a and the second battery module 100b, and partitions the disposition of the first battery module 100a and the second battery module 100b.

The battery pack 10 includes a high current bus bar 196 that electrically connects the first battery module 100a and the second battery module 100b existing inside the same battery pack 10, and a power line 198 that electrically connects any one of the first battery module 100a and the second battery module 100b included in the same battery pack 10 with another battery pack 10. The battery pack 10 includes a signal line 199 for transmitting voltage and current information of the first battery module 100a and the second battery module 100b included in the same battery pack 10.

The battery pack 10 includes a high current bus bar 196 that electrically connects one first cell array 102 included in the first battery module 100a and one first cell array 102 included in the second battery module 100b. The battery pack 10 includes a module screw 194 for fastening the first battery module 100a and the second battery module 100b.

The first battery module 100a and the second battery module 100b may be disposed such that portions where the positive terminal 101a and the negative terminal 101b of the battery cell 101 are disposed face each other. That is, the second frame 130 of the first battery module 100a and the second frame 130 of the second battery module 100b may be disposed to face each other.

An insulating plate 192 is disposed between the first battery module 100a and the second battery module 100b. The insulating plate 192 prevents contact between the battery cell 101 disposed in the first battery module 100a and the battery cell 101 disposed in the second battery module 100b. The insulating plate 192 is provided with a plate groove 192a through which the module screw 194 passes.

In a state in which the first battery module 100a and the second battery module 100b are fastened by the module screw 194, the module screw 194 is disposed in the plate groove 192a so that the disposition of the insulating plate 192 can be fixed.

Figure 11A:
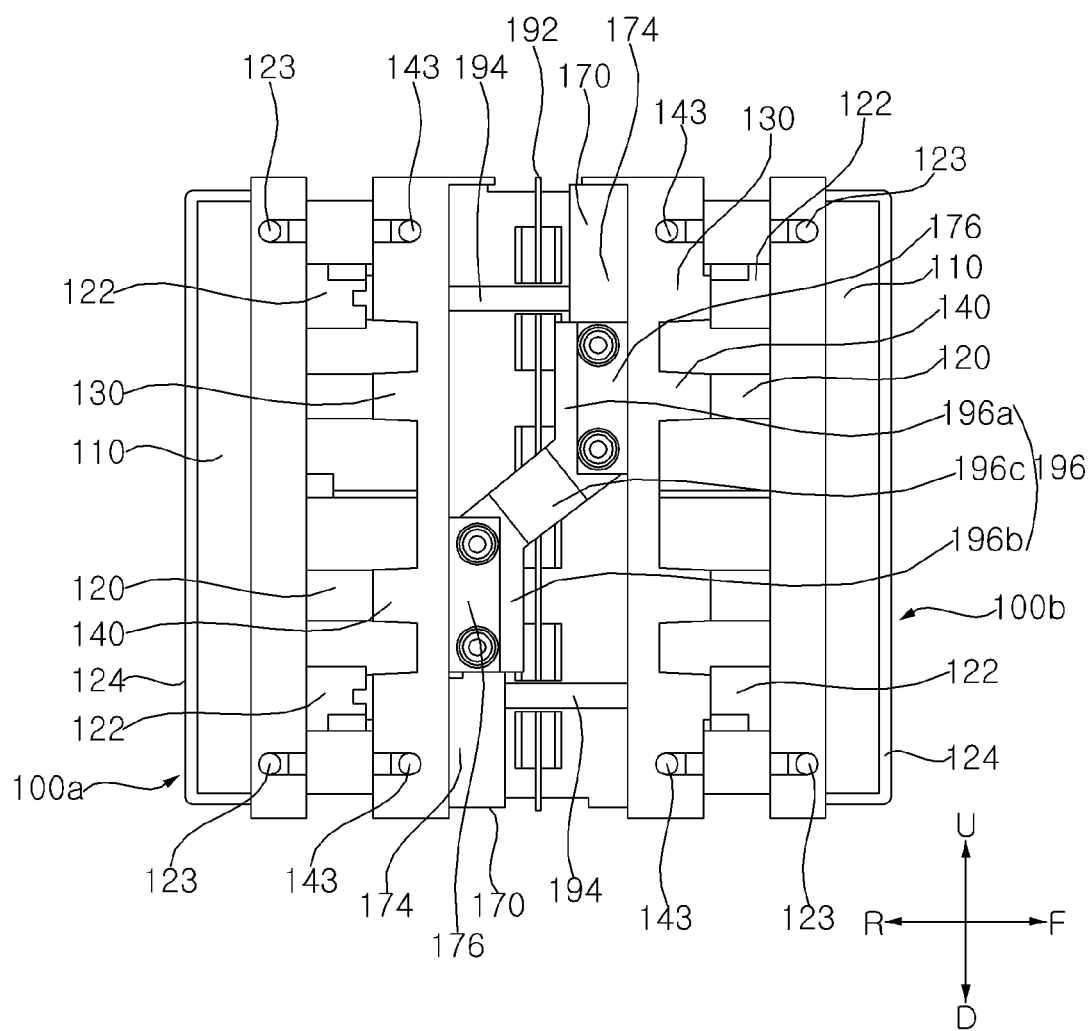
FIG. 11A is one side view of FIG. 10.

Referring to FIG. 11A, the high current bus bar 196 connects the first battery module 100a and the second battery module 100b in series.

The high current bus bar 196 connects the fourth bus bar 170 disposed in the first battery module 100a and the fourth bus bar 170 disposed in the second battery module 100b. The high current bus bar 196 is mounted in each of the connecting hangers 176 of the fourth bus bar 170 disposed in the first battery module 100a and the fourth bus bar 170 disposed in the second battery module 100b.

The high current bus bar 196 includes a first contact portion 196a connected to the first battery module 100a, a second contact portion 196b connected to the second battery module 100b, and a connecting portion 196c connecting the first contact portion 196a and the second contact portion 196b. The connecting portion 196c may be disposed in a diagonal shape to connect the first contact portion 196a and the second contact portion 196b.

Figure 11B:
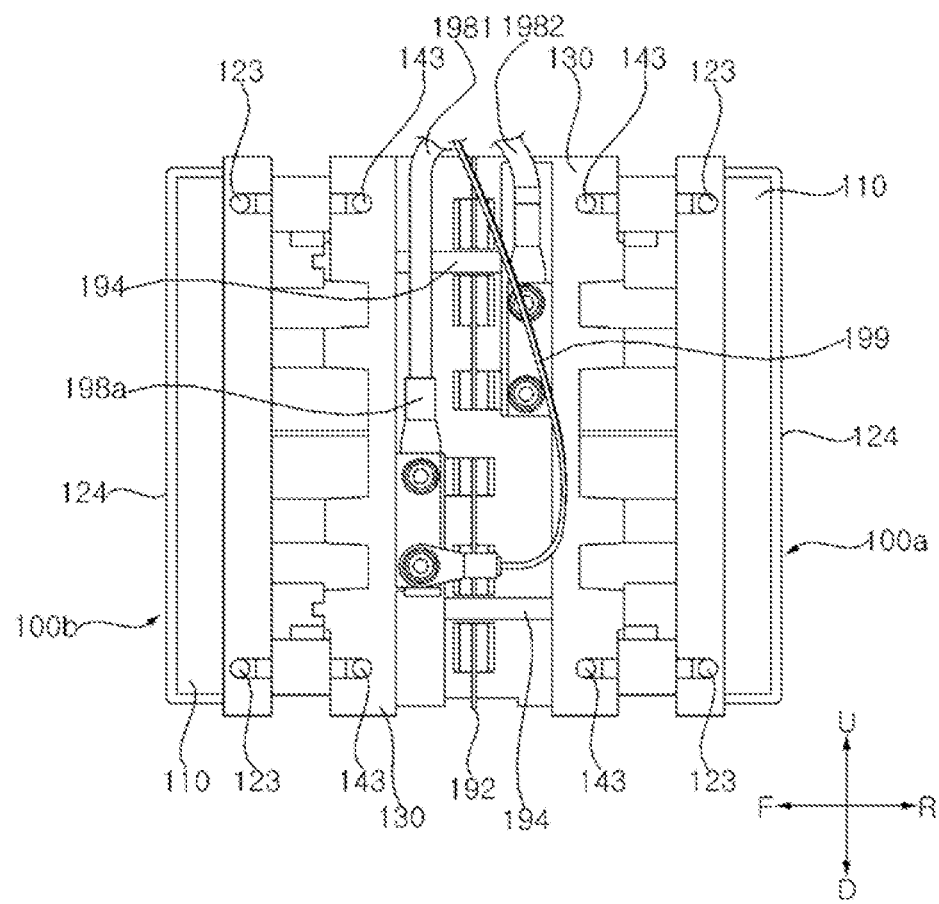
FIG. 11B is the other side view of FIG. 10.

Referring to FIG. 11B, the power line 198 includes a first power line 1981 connected to the fifth bus bar 180 of the first battery module 100a and a second power line 1982 connected to the fifth bus bar 180 of the second battery module 100b. The first power line 1981 and the second power line 1982 are connected to different battery packs 10.

The signal line 199 includes a first power line connected to the fifth bus bar 180 of the first battery module 100a and a second power line (not shown) connected to the fifth bus bar 180 of the second battery module 100b. Each of the first signal line of signal line 199 and the second signal line of signal line 199 may be connected to the battery pack circuit substrate 220 (FIG. 2).

Referring to FIG. 12, the module screw 194 connects the first frame 110 of the first battery module 100a and the first frame 110 of the second battery module 100b. Referring to FIG. 12, the module screw 194 includes a screw header 194a fixed to one of the first battery module 100a or the second battery module 100b, a screw fastening portion 194b fixed to the other one of the first battery module 100a or the second battery module 100b, and a screw support 194c connecting the screw header 194a and the screw fastening portion 194b. The screw support 194c passes through the support protrusion 142 of the second frame 130.

Referring to FIGS. 11A to 11B, in each of the first frame 110 of the first battery module 100*a* and the first frame 110 of the second battery module 100*b*, a first fastening hole 123 formed to be fastened with the upper fixing bracket 200 or the lower fixing bracket 210 (FIG. 2) is formed.

Referring to FIGS. 11A to 11B, in each of the second frame 130 of the first battery module 100*a* and the second frame 130 of the second battery module 100*b*, a second fastening hole 143 formed to be fastened with each of a pair of side covers 240*a* and 240*b* (FIG. 2) is formed.

<Add Upper Fixing Bracket, Lower Fixing Bracket, Battery Pack Circuit Substrate>

Hereinafter, a structure in which the upper fixing bracket and the lower fixing bracket are mounted in the battery module will be described with reference to FIGS. 13 to 14B.

Figure 13:
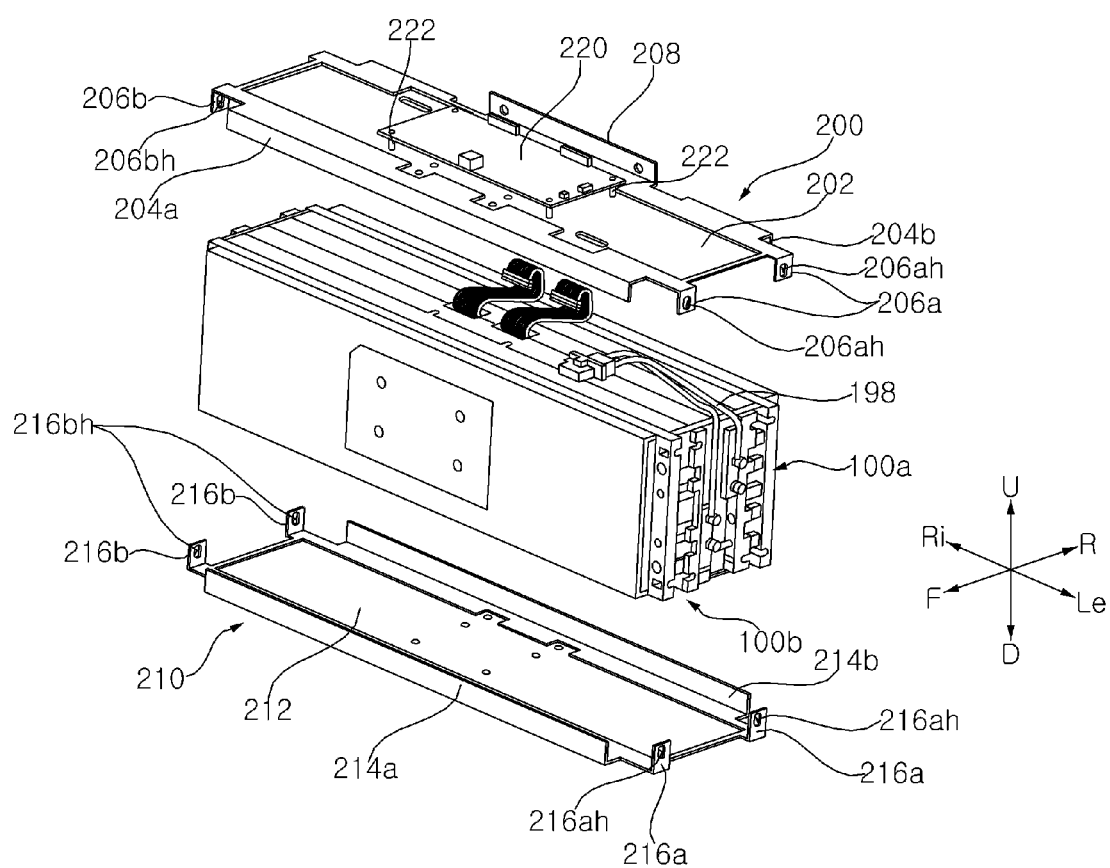
FIG. 13 is an exploded perspective view in which an upper fixing bracket, a lower fixing bracket, and a battery pack circuit substrate are added to a structure of FIG. 10.
Figure 14A:
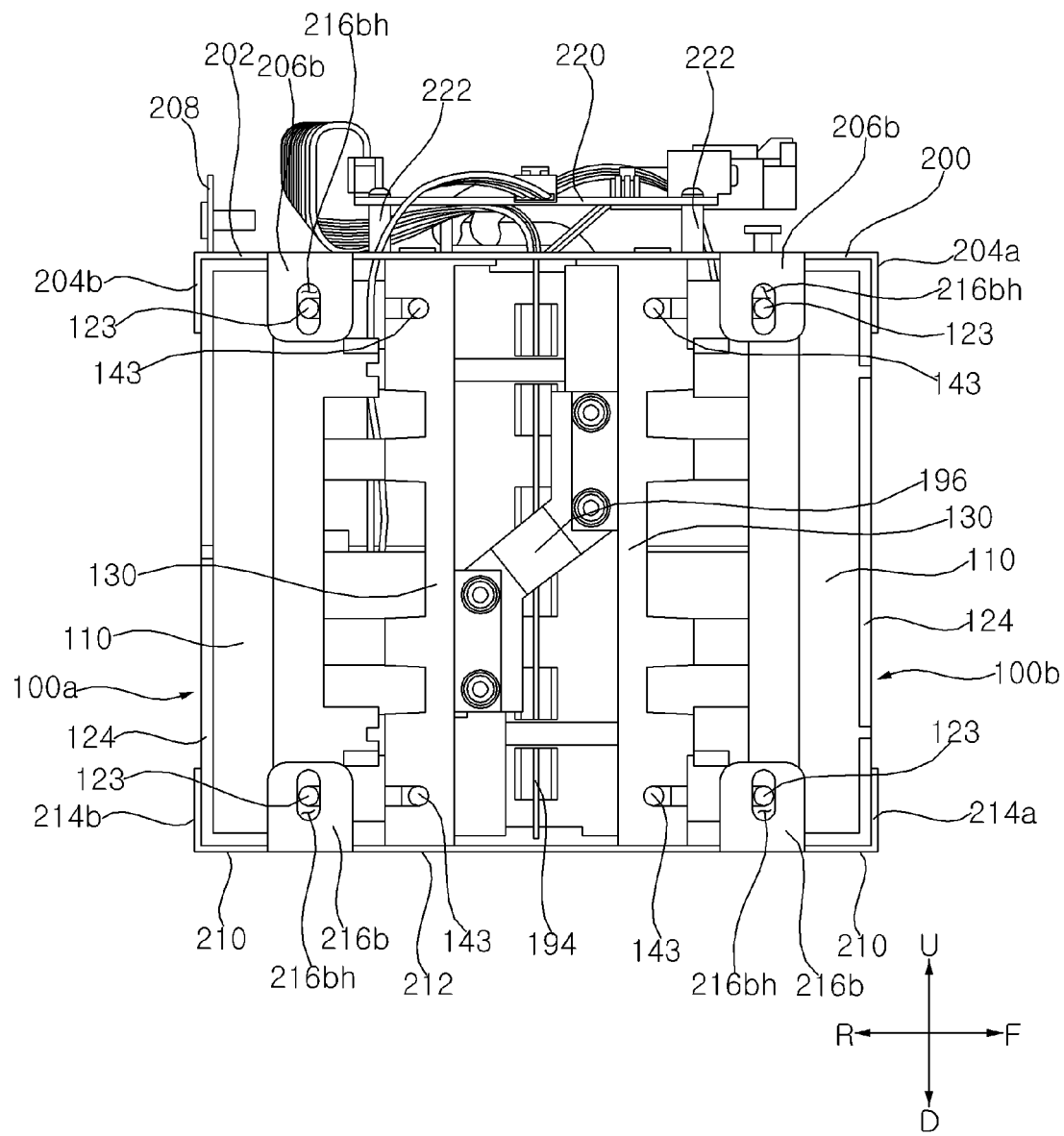
FIG. 14A is one side view in a coupled state of FIG. 13.
Figure 14B:
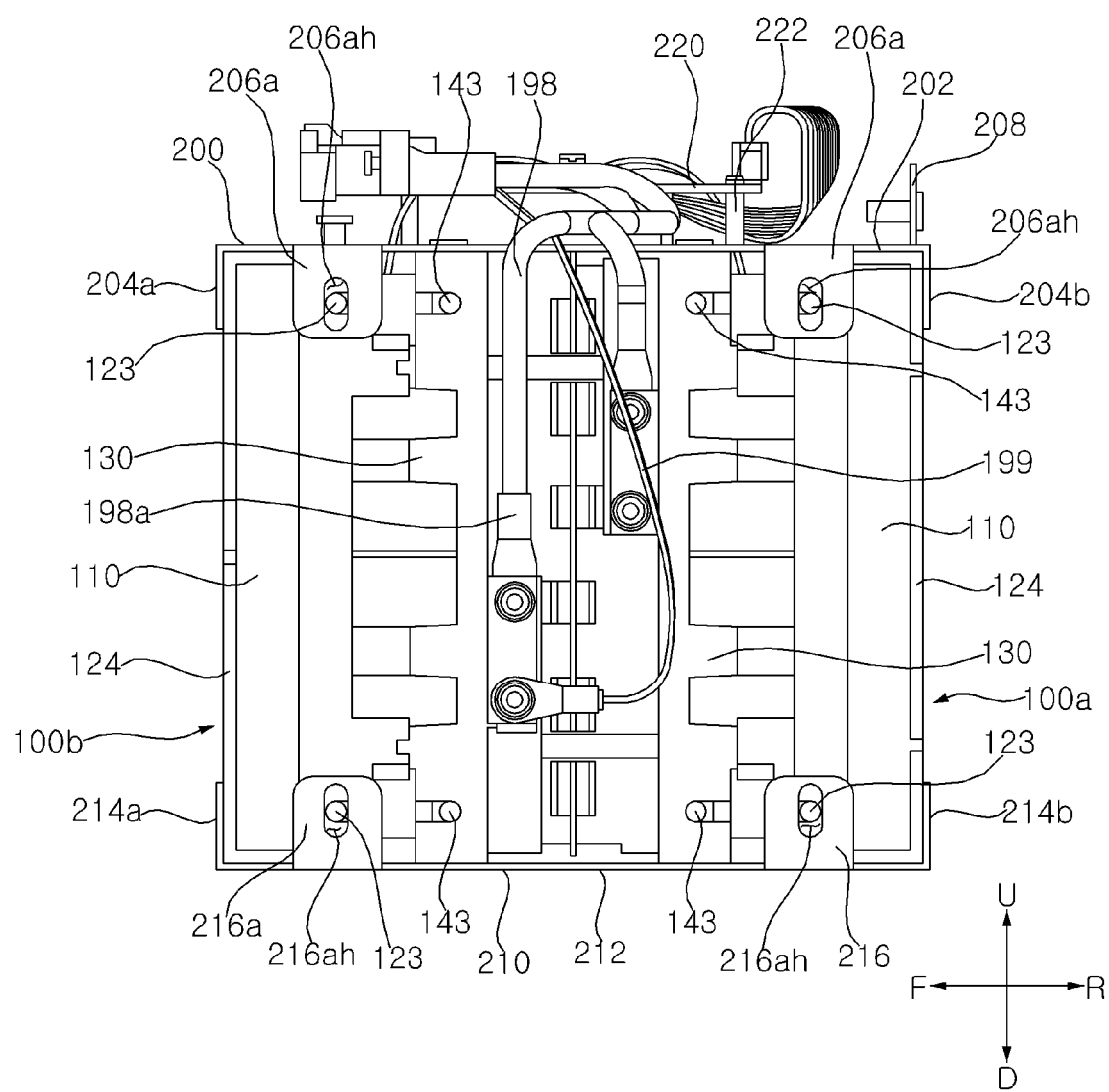
FIG. 14B is the other side view in a coupled state of FIG. 13.

Referring to FIG. 13 and FIGS. 14*a*-14*b*, the battery pack 10 includes an upper fixing bracket 200 which is disposed in an upper portion of the battery module 100*a*, 100*b* and fixes the battery module 100*a*, 100*b*, a lower fixing bracket 210 which is disposed in a lower portion of the battery module 100 and fixes the battery modules 100*a* and 100*b*, a battery pack circuit substrate 220 which is disposed in an upper side of the upper fixing bracket 200 and collects sensing information of the battery module 100*a*, 100*b*, and a spacer 222 which separates the battery pack circuit substrate 220 from the upper fixing bracket 200.

The upper fixing bracket 200 is disposed in an upper side of the battery module 100*a*, 100*b*. The upper fixing bracket 200 includes an upper board 202 that covers at least a portion of the upper side of the battery module 100*a*, 100*b*, a first upper holder 204*a* which is bent downward from the front end of the upper board 202 and disposed in contact with the front portion of the battery module 100*a*, 100*b*, a second upper holder 204*b* which is bent downward from the rear end of the upper board 202 and disposed in contact with the rear portion of the battery module 100*a*, 100*b*, a first upper mounter 206*a* which is bent downward from one side end of the upper board 202 and coupled to one side of the battery module 100*a*, 100*b*, a second upper mounter 206*b* which is bent downward from the other side end of the upper board 202 and coupled to the other side of the battery module 100*a*, 100*b*, and a rear bender 208 which is bent upward from the rear end of the upper board 202.

The upper board 202 is disposed in the upper side of the battery module 100*a*, 100*b*. Each of the first upper mounter 206*a* and the second upper mounter 206*b* is disposed to surround the front and rear of the battery module 100*a*, 100*b*. Accordingly, the first upper mounter 206*a* and the second upper mounter 206*b* may maintain a state in which the first battery module 100*a* and the second battery module 100*b* are coupled.

A pair of first upper mounters 206*a* spaced apart in the front-rear direction are disposed in one side end of the upper board 202. A pair of second upper mounters 206*b* spaced apart in the front-rear direction are disposed in the other side end of the upper board 202.

The pair of first upper mounters 206*a* are coupled to the first fastening hole 123 formed in the first battery module 100*a* and the second battery module 100*b*. In each of the pair of first upper mounters 206*a*, a first upper mounter hole 206*ah* is formed in a position corresponding to the first fastening hole 123. Similarly, the pair of second upper mounters 206*b* are coupled to the first fastening hole 123 formed in the first battery module 100*a* and the second battery module 100*b*, and a second upper mounter hole 206*bh* is formed in a position corresponding to the first fastening hole 123.

The position of the upper fixing bracket 200 can be fixed in the upper side of the battery module 100*a*, 100*b* by the first upper holder 204*a*, the second upper holder 204*b*, the first upper mounter 206*a*, and the second upper mounter 206*b*. That is, due to the above structure, the upper fixing bracket 200 can maintain the structure of the battery module 100*a*, 100*b*.

The upper fixing bracket 200 is fixed to the first frame 110 of each of the first battery module 100*a* and the second battery module 100*b*. Each of the first upper mounter 206*a* and the second upper mounter 206*b* of the upper fixing bracket 200 is fixed to the first fastening hole 123 formed in the first frame 110 of each of the first battery module 100*a* and the second battery module 100*b*.

The rear bender 208 may fix a top cover 230 described below. The rear bender 208 may be fixed to a rear wall 234 of the top cover 230. The rear bender 208 may limit the rear movement of the top cover 230. Accordingly, it is possible to facilitate fastening of the top cover 230 and the upper fixing bracket 200.

The lower fixing bracket 210 is disposed in the lower side of the battery module 100*a*, 100*b*. The lower fixing bracket 210 includes a lower board 212 that covers at least a portion of the lower portion of the battery module 100*a*, 100*b*, a first lower holder 214*a* which is bent upward from the front end of the lower board 212 and disposed in contact with the front portion of the battery module 100*a*, 100*b*, a second lower holder 214*b* which is bent upward from the rear end of the lower board 212 and disposed in contact with the rear portion of the battery module 100*a*, 100*b*, a first lower mounter 216*a* which is bent upward from one side end of the lower board 212 and coupled to one side of the battery module 100*a*, 100*b*, and a second lower mounter 216*b* which is bent upward from the other side end of the lower board 212 and coupled to the other side of the battery module 100.

Each of the first lower mounter 216*a* and the second lower mounter 216*b* is disposed to surround the front and rear of the battery module 100*a*, 100*b*. Accordingly, the first lower mounter 216*a* and the second lower mounter 216*b* may maintain the state in which the first battery module 100*a* and the second battery module 100*b* are coupled.

A pair of first lower mounters 216*a* spaced apart in the front-rear direction are disposed in one side end of the lower board 212. A pair of second lower mounters 216*b* spaced apart in the front-rear direction are disposed in the other side end of the lower board 212.

The pair of first lower mounters 216*a* are coupled to the first fastening hole 123 formed in the first battery module 100*a* and the second battery module 100*b*. In each of the pair of first lower mounters 216*a*, a first lower mounter hole 216*ah* is formed in a position corresponding to the first fastening hole 123. Similarly, the pair of second lower mounters 216*b* are coupled to the first fastening hole 123 formed in the first battery module 100*a* and the second battery module 100*b*, and a second lower mounter hole 216*bh* is formed in a position corresponding to the first fastening hole 123.

The lower fixing bracket 210 is fixed to the first frame 110 of each of the first battery module 100*a* and the second battery module 100*b*. Each of the first lower mounter 216*a* and the second lower mounter 216*b* of the lower fixing bracket 210 is fixed to the first fastening hole 123 formed in the first frame 110 of each of the first battery module 100*a* and the second battery module 100*b*.

The battery pack circuit substrate 220 may be fixedly disposed in the upper side of the upper fixing bracket 200.

The battery pack circuit substrate 220 is connected to the sensing substrate 190, the bus bar, or a thermistor 224 described below to receive information of a plurality of battery cells 101 disposed inside the battery pack 10. The battery pack circuit substrate 220 may transmit information of the plurality of battery cells 101 to the main circuit substrate 34*a* described below.

The battery pack circuit substrate 220 may be spaced apart from the upper fixing bracket 200 upward. A plurality of spacers 222 are disposed, between the battery pack circuit substrate 220 and the upper fixing bracket 200, to space the battery pack circuit substrate 220 upward from the upper fixing bracket 200. The plurality of spacers 222 may be disposed in an edge portion of the battery pack circuit substrate 220.

<Add Side Cover, Side Bracket, Top Cover, Cooling Fan>

Figure 15:
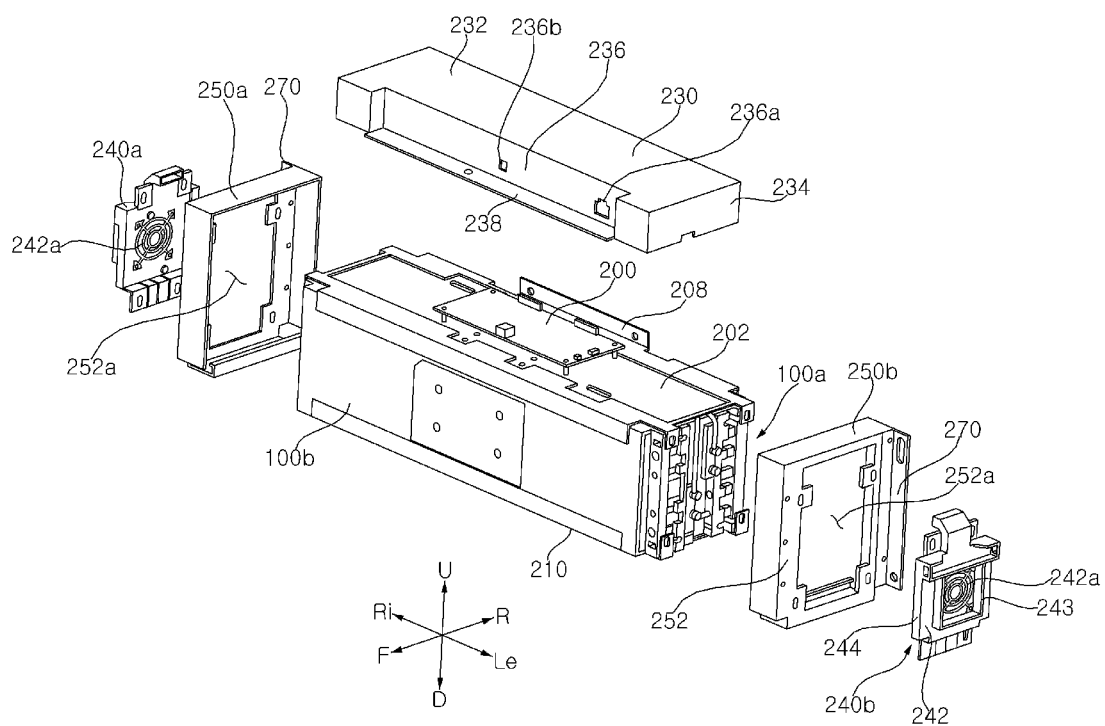
FIG. 15 is an exploded perspective view of a battery pack in which a top cover, a side cover, and a side bracket are added to a structure of FIG. 13.
Figure 16A:
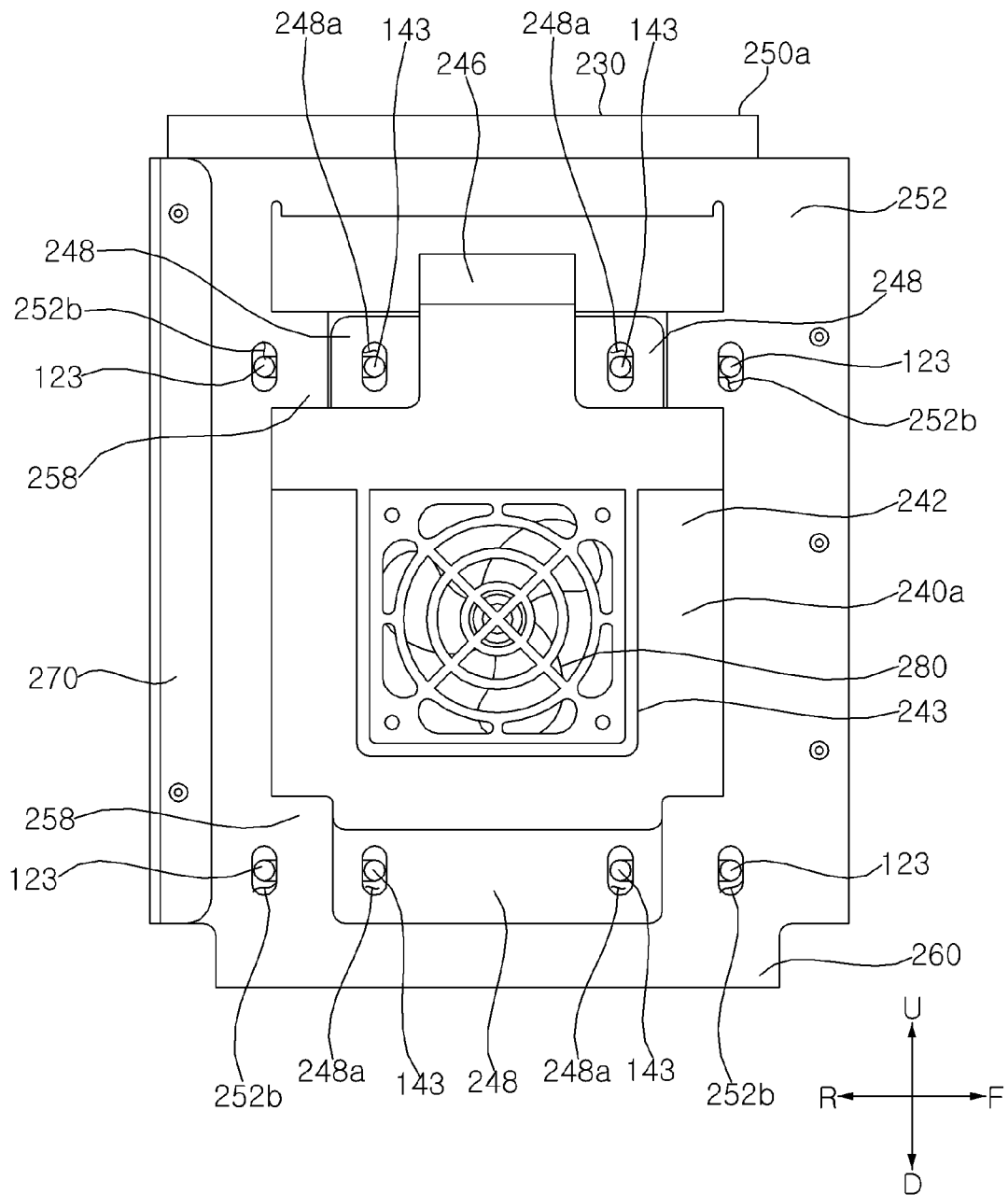
FIG. 16A is one side view of a battery pack according to an embodiment of the present disclosure.
Figure 16B:
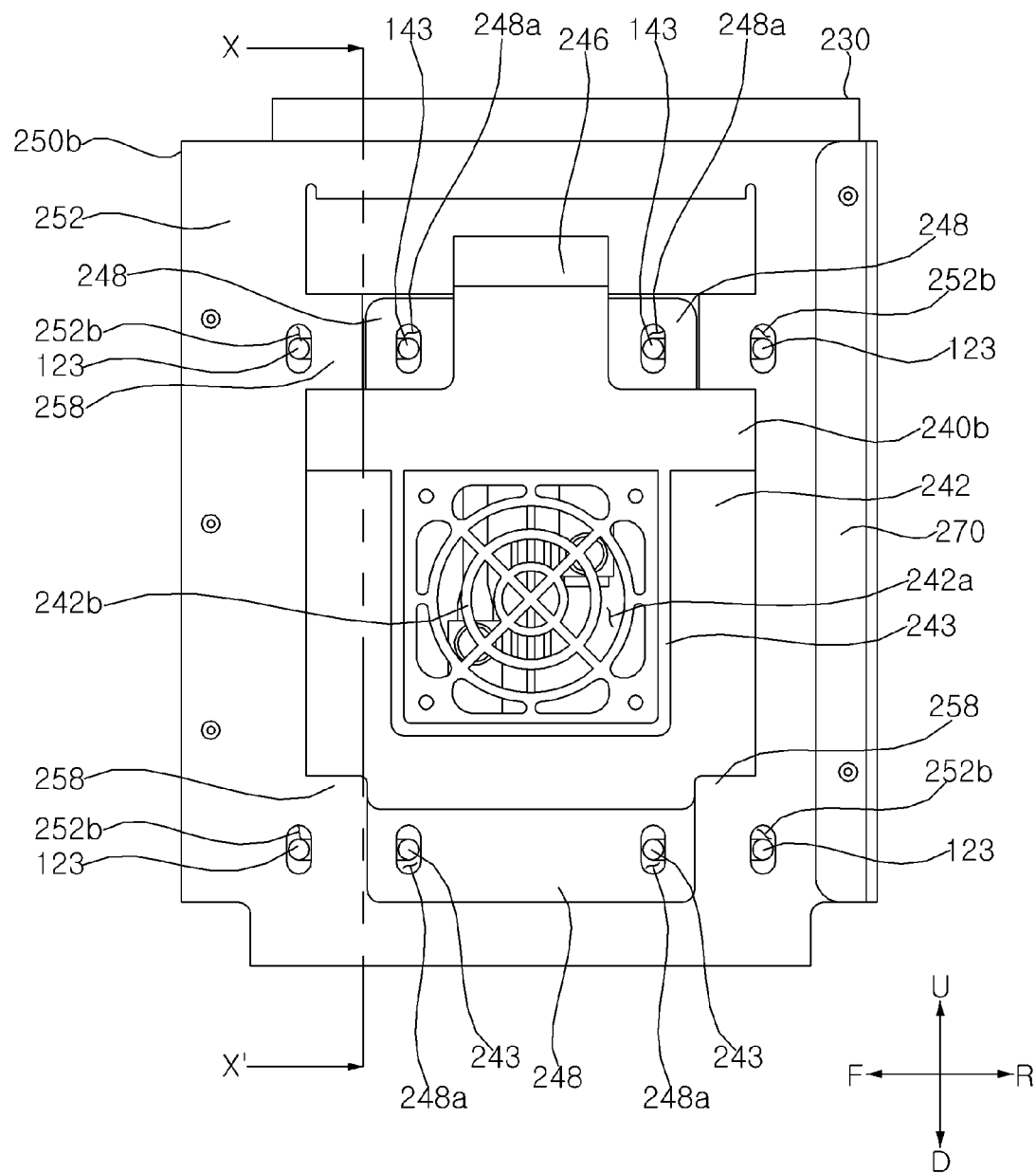
FIG. 16B is the other side view of a battery pack according to an embodiment of the present disclosure.

Hereinafter, a structure in which the side cover, the side bracket, the top cover, and the cooling fan are mounted in the battery module to which the upper fixing bracket and the lower fixing bracket are coupled will be described with reference to FIGS. 15 to 16B.

The battery pack 10 further includes a top cover 230 which is disposed in the upper side of the upper fixing bracket 200, and covers the upper side of the battery pack circuit substrate 220, a pair of side covers 240*a*, 240*b* which are disposed in both sides of the battery module 100*a*, 100*b*, and have a cooling hole 242*a* formed therein, a pair of side brackets 250*a*, 250*b* which are disposed in both sides of the battery module 100*a*, 100*b* and fix the disposition of the battery module 100*a*, 100*b*, and a cooling fan 280 which is disposed in one side surface of the battery module 100*a*, 100*b*, and forms an air flow inside the battery module 100*a*, 100*b*.

The top cover 230 is disposed in the upper side of the upper fixing bracket 200, and forms a space in which the battery pack circuit substrate 220 is disposed. The top cover 230 is disposed to cover the circumference of the battery pack circuit substrate 220. The top cover 230 may protect the battery pack circuit substrate 220 from the outside. In addition, the top cover 230 may prevent an impact that can be received from the upper side from being transmitted to each of the battery cells 101 disposed in the lower side.

The top cover 230 is fastened to the rear bender 208 of the upper fixing bracket 200 from the rear. The top cover 230 includes an upper cover 232 spaced upwardly from the upper fixing bracket 200, a rear wall 234 that is bent downward from the rear end portion of the upper cover 232 and extended, a front wall 236 that extends downward from the front end portion of the upper cover 232 and is bent, and a front rib 238 that is bent forward from the lower end portion of the front wall 236 and is extended.

The disposition of the top cover 230 can be fixed as the rear wall 234 is fastened to the rear bender 208 and the front rib 238 is fastened to the upper board 202. A first through hole 236*a* through which the power line 198 passes and a second through hole 236*b* through which a communication line 36 (FIG. 25) extending from the battery pack circuit substrate 220 passes are formed in the front wall 236.

Each of the pair of side covers 240*a* and 240*b* is disposed in both sides of the battery module 100*a*, 100*b* to fix the disposition of the first battery module 100*a* and the second battery module 100*b*.

Each of the pair of side covers 240*a* and 240*b* is fixed to the second frame 130 of each of the first battery module 100*a* and the second battery module 100*b*. Each of the pair of side covers 240*a* and 240*b* is fixed to the second fastening hole 143 formed in the second frame 130 of each of the first battery module 100*a* and the second battery module 100*b*.

Each of the pair of side covers 240*a* and 240*b* includes a cover plate 242 having a cooling hole 242*a* formed therein, a cover side wall 244 that is bent from both sides of the cover plate 242 and spaced apart from one side of the battery module 100*a*, 100*b*, a wire guide portion 246 (FIGS. 16*a*-16*b*) which is disposed in the upper side of the cover plate 242 and extended upwardly, and a cover fastening portion 248 (FIGS. 16*a*-16*b*) which is disposed in one side of the cover plate 242 and has a cover hole 248*a* formed therein.

A rib 242*b* (not shown) is disposed in the cover plate 242 at a portion where the cooling hole 242*a* is formed. The rib 242*b* may reinforce the rigidity of the side cover at the portion where the cooling hole 242*a* is formed. A mounting rib 243 protruding outward from a circumference portion in which the cooling hole 242*a* is formed is disposed in the cover plate 242. A cooling fan 280 may be mounted inside the mounting rib 243.

The cover fastening portion 248 may be disposed to extend to the lower side of of the cover plate 242 or to extend to the upper side of the wire guide portion 246. In the cover fastening portion 248, a cover hole 248*a* is formed in a portion corresponding to the second fastening hole 143. A separate fastening screw (not shown) may pass through the cover hole 248*a* and the second fastening hole 143 to fasten the battery module 100*a*, 100*b* to the side cover.

The wire guide portion 246 has a structure extending upwardly from the cover plate 242. The wire guide portion 246 extends to the upper side of the upper fixing bracket 200. The wire guide portion 246 forms a space in which the power line 198 or a signal line 199 is disposed.

Each of the pair of side brackets 250*a*, 250*b* includes a bracket body 252, a bracket side wall 254 protruding from both sides of the bracket body 252 in the direction of the battery module 100*a*, 100*b*, a bracket top wall 256 protruding from the upper side of the bracket body 252 in the direction of the battery module 100*a*, 100*b*, and a shock absorbing portion 260 disposed in the lower side of the bracket body 252.

Each of the pair of side brackets 250*a* and 250*b* is coupled to the first fastening hole 123 formed in the first battery module 100*a* and the second battery module 100*b*. Each of the pair of side brackets 250*a* and 250*b* is disposed in the outside of the upper fixing bracket 200 or the lower fixing bracket 210, and is coupled to the first fastening hole 123 formed in the first battery module 100*a* and the second battery module 100*b*.

A specific configuration and shape of the side bracket will be described in detail below.

The cooling fan 280 is mounted in one of the pair of side covers 240*a* and 240*b*. The cooling fan 280 may be mounted inside the mounting rib 243 disposed in the side cover.

<Heat Dissipation Structure>

Hereinafter, a structure for heat dissipation of the battery pack will be described with reference to FIGS. 17 to 19.

The battery pack 10 of the present disclosure has a structure in which the plurality of battery cells 101 are cooled by air cooling. The air used for the air cooling may be ambient air or pre-cooled air. Accordingly, in the battery pack 10 of the present disclosure, the cooling fan 280 is disposed in one side, and the plurality of battery cells 101 disposed therein are spaced apart from each other to form a space in which air flows.

Figure 17:
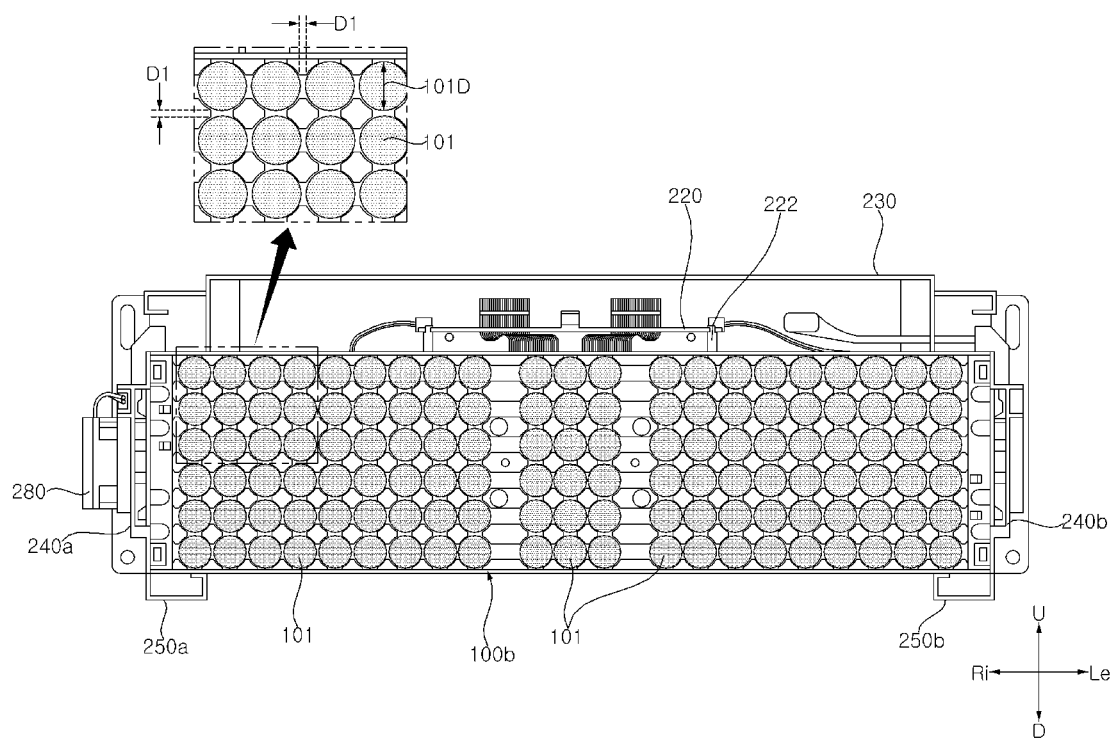
FIG. 17 is a cross-sectional view taken along line X-X' of FIG. 16A.

Referring to FIG. 17, a plurality of battery cells 101 are spaced apart from each other in four directions which are perpendicular to each other. Referring to FIG. 17, a plurality of battery cells 101 are spaced apart from each other in up, down, left, and right directions.

The disposition of the plurality of battery cells 101 is fixed by the second fixing protrusion 134 of the second frame 130 and the first fixing protrusion 114 of the first frame 110.

Referring to FIG. 17, a distance D1 between the battery cell 101 and other adjacently disposed battery cell 101 may be 0.1 to 0.2 times a diameter 101D of the battery cell 101. Other dimensions are within scope of the present invention. An air flow may be formed between the spacing of the plurality of battery cells 101 by the operation of the cooling fan 280.

Figure 18:
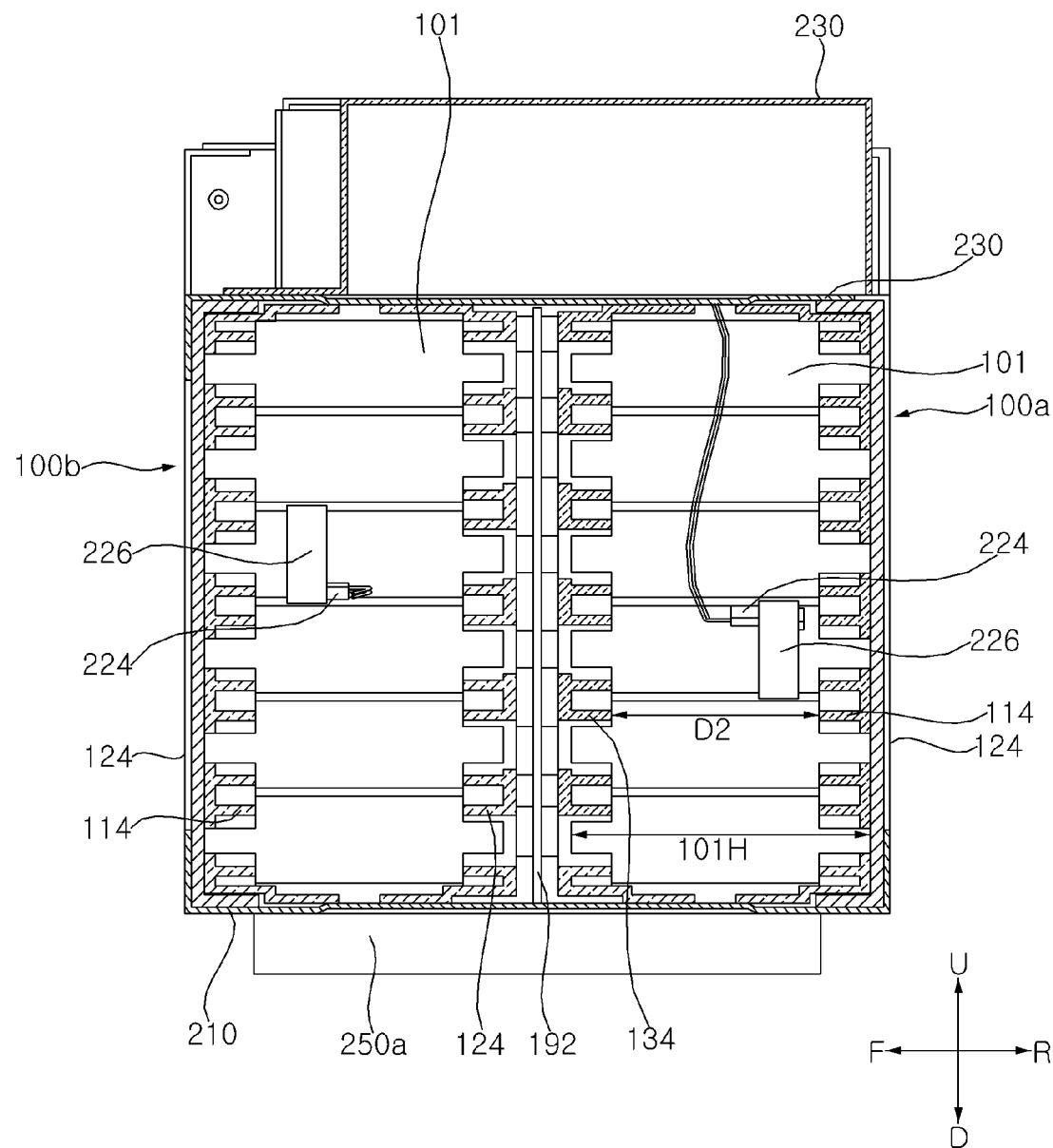
FIG. 18 is a cross-sectional view for explaining a disposition of battery cells inside a battery pack.

Referring to FIG. 18, a distance D2 between the second fixing protrusion 134 of the second frame 130 and the first fixing protrusion 114 of the first frame 110 may be 0.5 to 0.9 times the height 101H of the battery cell 101. Other dimensions are within scope of the present invention. Accordingly, the area in which the outer circumference of the battery cell 101 is in contact with the flowing air can be maximized.

The cooling fan 280 operates to discharge the air inside the battery module 100a, 100b to the outside. Accordingly, when the cooling fan 280 operates, external air is supplied to the battery module 100a, 100b through the cooling hole 242a of the side cover 240 where the cooling fan 280 is not disposed. In addition, when the cooling fan 280 operates, the air inside the battery module 100a, 100b may be discharged to the outside through the cooling hole 242a of the side cover 240 in which the cooling fan 280 is disposed.

Referring to FIG. 17, the cover plate 242 of each of the pair of side covers 240a and 240b is disposed to be spaced apart from one side end of the battery module 100a, 100b. The size of the cooling hole 242a is formed smaller than the size of one side surface of the battery module 100a, 100b. Accordingly, the cover plate 242 having the cooling hole 242a formed therein is spaced apart from one side end of the battery module 100a, 100b so that the air introduced through the cooling hole 242a flows to each of the plurality of battery cells 101.

The heat dissipation plate 124 is disposed in a lower portion of each of the plurality of battery cells 101. The heat dissipation plate 124 may be formed of an aluminum material to dissipate heat generated in the battery cell 101 to the outside. Other materials are within scope of the present invention. Each of the plurality of battery cells 101 may be adhered to the heat dissipation plate 124 through a conductive adhesive solution.

The conductive adhesive solution, which is a bonding solution containing alumina, fixes the heat dissipation plate 124 disposed in a lower portion of the battery cell 101 and transfers heat generated from the battery cell 101 to the heat dissipation plate 124. Other adhesive materials are within scope of the present invention.

In some of the plurality of battery cells 101, a thermistor 224 for measuring the temperature of the battery cell 101, and a mounting ring 226 (FIG. 19) for fixing the disposition of the thermistor 224 to the outer circumference of the battery cell 101 are disposed. The thermistor 224 may be disposed in the battery cell 101 disposed in a portion where mainly temperature is increased among the plurality of battery cells 101.

Figure 19:
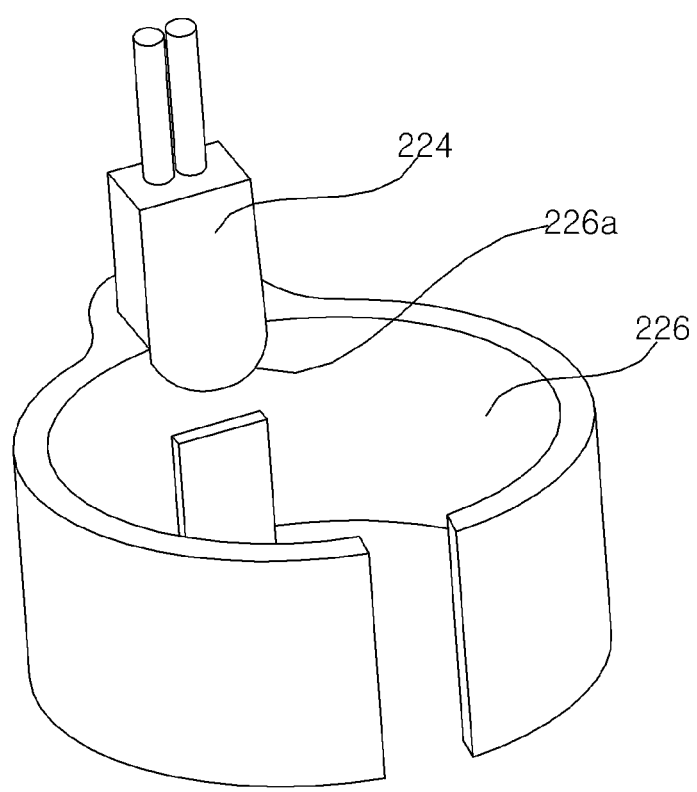
FIG. 19 is a perspective view of a thermistor according to an embodiment of the present disclosure.
Figure 20A:
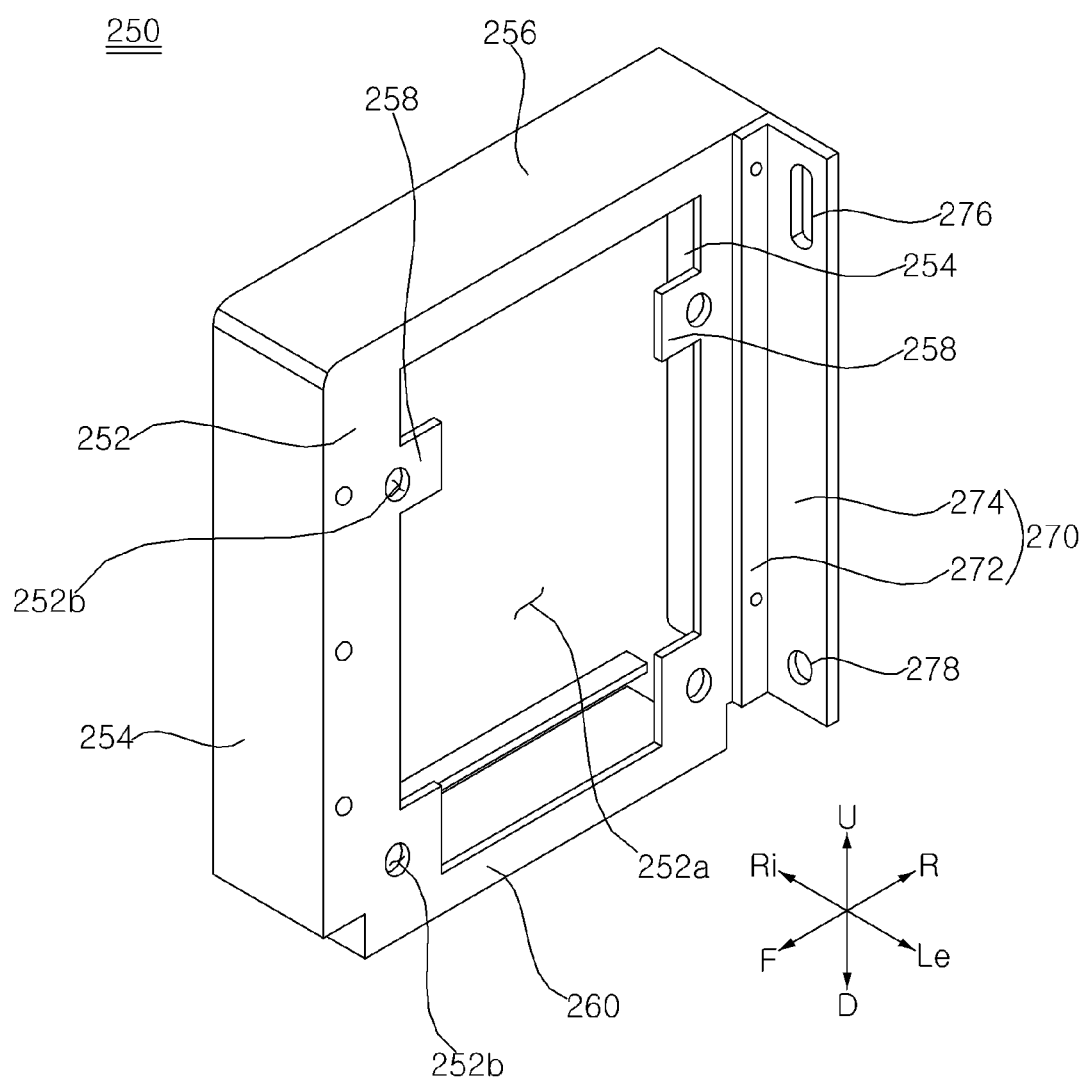
FIG. 20A is one side perspective view of a side bracket according to an embodiment of the present disclosure.
Figure 20B:
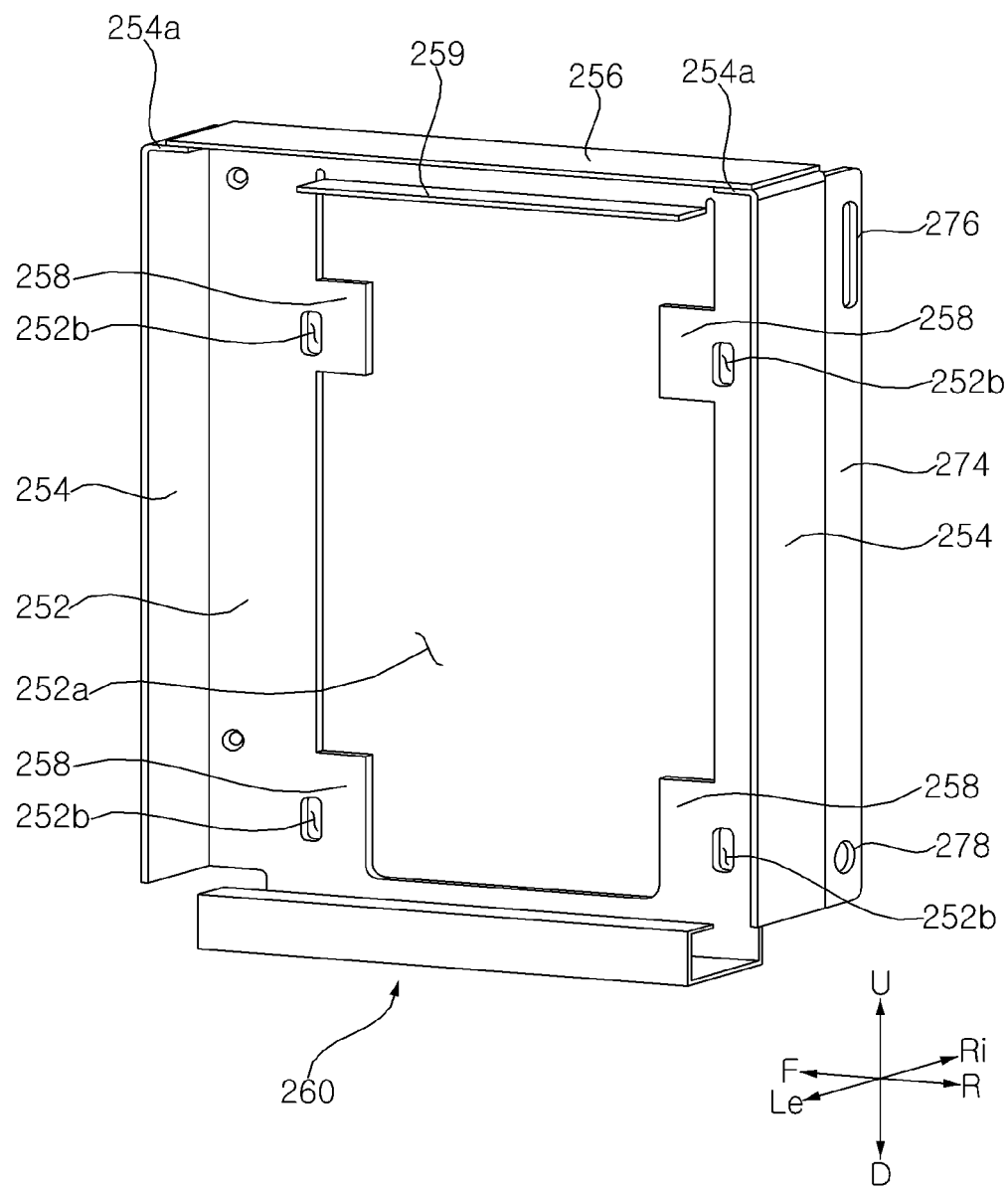
FIG. 20B is the other side perspective view of a side bracket according to an embodiment of the present disclosure.

As seen in FIG. 19, mounting ring 226 has an open ring shape at one side, and forms a mounting groove 226a in which the thermistor 224 is mounted at one side that is not opened. The mounting ring 226 is mounted in the outer circumference of the battery cell 101 to bring the thermistor 224 into contact with the outer circumferential surface of the battery cell 101.

The thermistor 224 is connected to the battery pack circuit substrate 220 through the signal line 199. The thermistor 224 may transmit temperature information detected by the battery cell 101 to the battery pack circuit substrate 220. The battery pack 10 may adjust the rotation speed of the cooling fan 280 based on the temperature information detected from the thermistor 224.

The heat dissipation plate 124 may be disposed to contact one side of the casing 12 (FIG. 25) described below. The casing 12 is configured to accommodate at least one battery pack 10. Accordingly, the heat dissipation plate 124 may transfer the heat received from the battery cell 101 to the casing 12.

<Spherical Structure of Side Bracket>

Hereinafter, the structure and shape of the side bracket 250 will be described with reference to FIGS. 20A to 22. The structure and shape of the side bracket 250 described below may be applied to both of the pair of side brackets 250a and 250b.

The side bracket 250 includes a bracket body 252 having an opening hole 252a formed therein, a pair of bracket sidewalls 254 protruding from both sides of the bracket body 252 in the direction of the battery module 100a, 100b, a bracket top wall 256 protruding in the direction of the battery module 100a, 100b from the upper side of the bracket body 252, and a shock absorbing portion 260 which is disposed in the lower side of the bracket body 252 and protrudes downward than the battery module 100a, 100b.

An opening hole 252a is formed in the bracket body 252. A side cover 240 may be disposed in the opening hole 252a. Accordingly, the opening hole 252a may be formed to be larger than the side cover 240.

In the bracket body 252, an inner protrusion 258 protruding to the inside in which the opening hole 252a is formed is disposed. The inner protrusion 258 may protrude toward the side cover 240.

A bracket hole 252b is formed in the bracket body 252 or the inner protrusions 258 so that the side bracket 250 is fastened to the battery module 100a, 100b. The bracket hole 252b is formed in a position corresponding to the first fastening hole 123 of the battery module 100a, 100b. The side bracket 250 may be fastened to the battery module 100a, 100b through a separate fastening screw (not shown).

The side bracket 250 includes a handle rib 259 protruding from one side of the bracket body 252. The handle rib 259 is disposed to protrude from the bracket body 252 in the direction of the battery module 100a, 100b, at the upper end portion of the opening hole 252a. The handle rib 259 is disposed in the upper side of the upper fixing bracket 200.

Each of the pair of bracket sidewalls 254 includes a bracket bending portion 254a that is bent in a direction facing each other at the upper end portion. The bracket bending portion 254a is disposed in the lower side of the bracket top wall 256.

Figure 21:
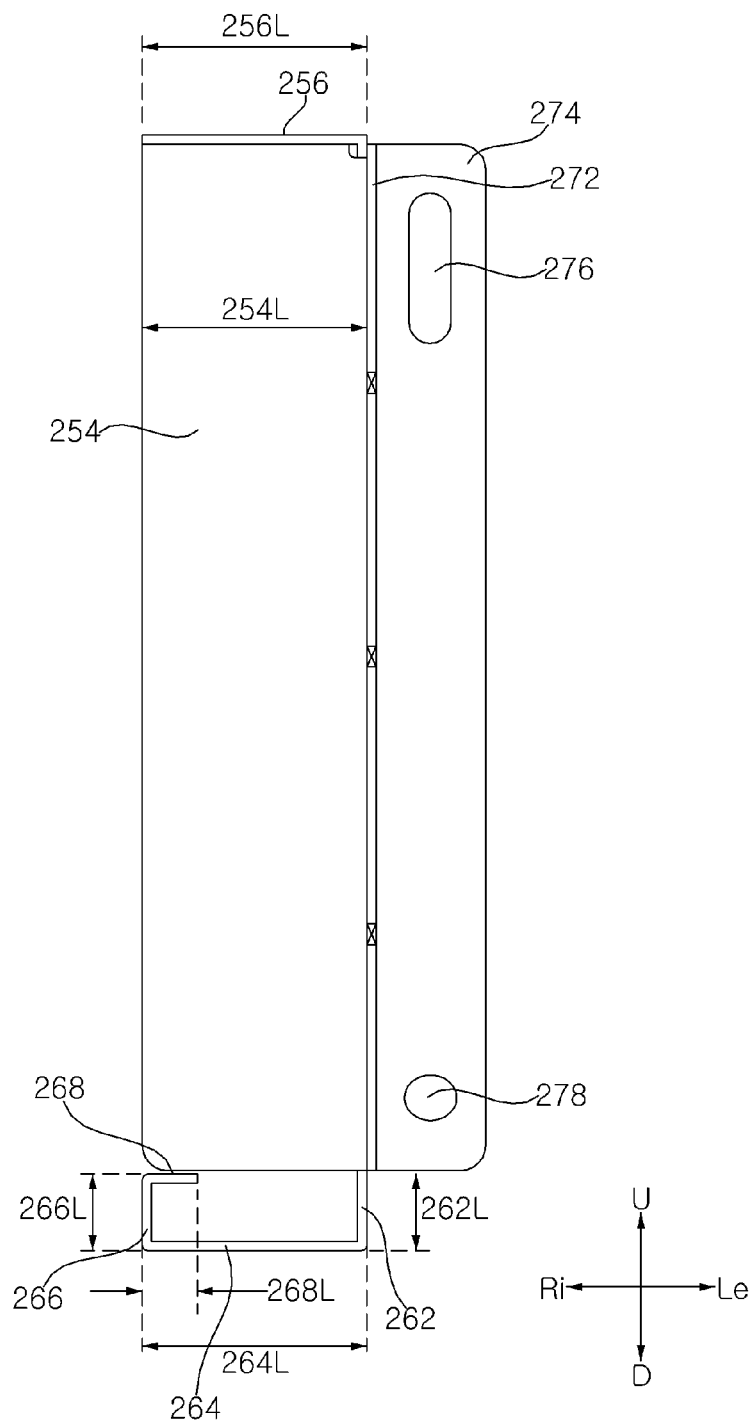
FIG. 21 is a side view of a side bracket according to an embodiment of the present disclosure.

Referring to FIG. 21, a length 254L of the bracket side wall 254 protruding from the bracket body 252 may be approximately the same as a length 256L of the bracket top wall 256 protruding from the bracket body. Other dimensions are within scope of the present invention.

Referring to FIG. 21, the shock absorbing portion 260 may be formed in a rectangular ring shape that extends downward from the bracket body 252 and has one side open. The shock absorbing portion 260 includes a first vertical plate 262 extending downward from the bracket body 252, a first horizontal plate 264 that is bent vertically from the lower end portion of the first vertical plate 262 and extends in the direction of the battery module 100a, 100b, a second vertical plate 266 that is bent from the end portion of the first horizontal plate 264 and extends upwardly, and a second horizontal plate 268 that is bent from the upper end of the second vertical plate 266 and extends in the direction of the first vertical plate 262.

Referring to FIG. 21, the length 262L of the first vertical plate 262 extending in the vertical direction is formed to be longer than the length 264L of the first horizontal plate 264 extending in the left-right direction. The length 264L of the first horizontal plate 264 may be formed to be 2 to 3 times the length 262L of the first vertical plate 262. The length 262L of the first vertical plate 262 may be longer than or equal to the length 266L of the second vertical plate 266. Other dimensions are within scope of the present invention.

The length 268L of the second horizontal plate 268 may be formed to be shorter than the length 264L of the first horizontal plate 264. The length 268L of the second horizontal plate 268 may be formed to be equal to or shorter than the length 262L of the first vertical plate 262. Other dimensions are within scope of the present invention.

Figure 22:
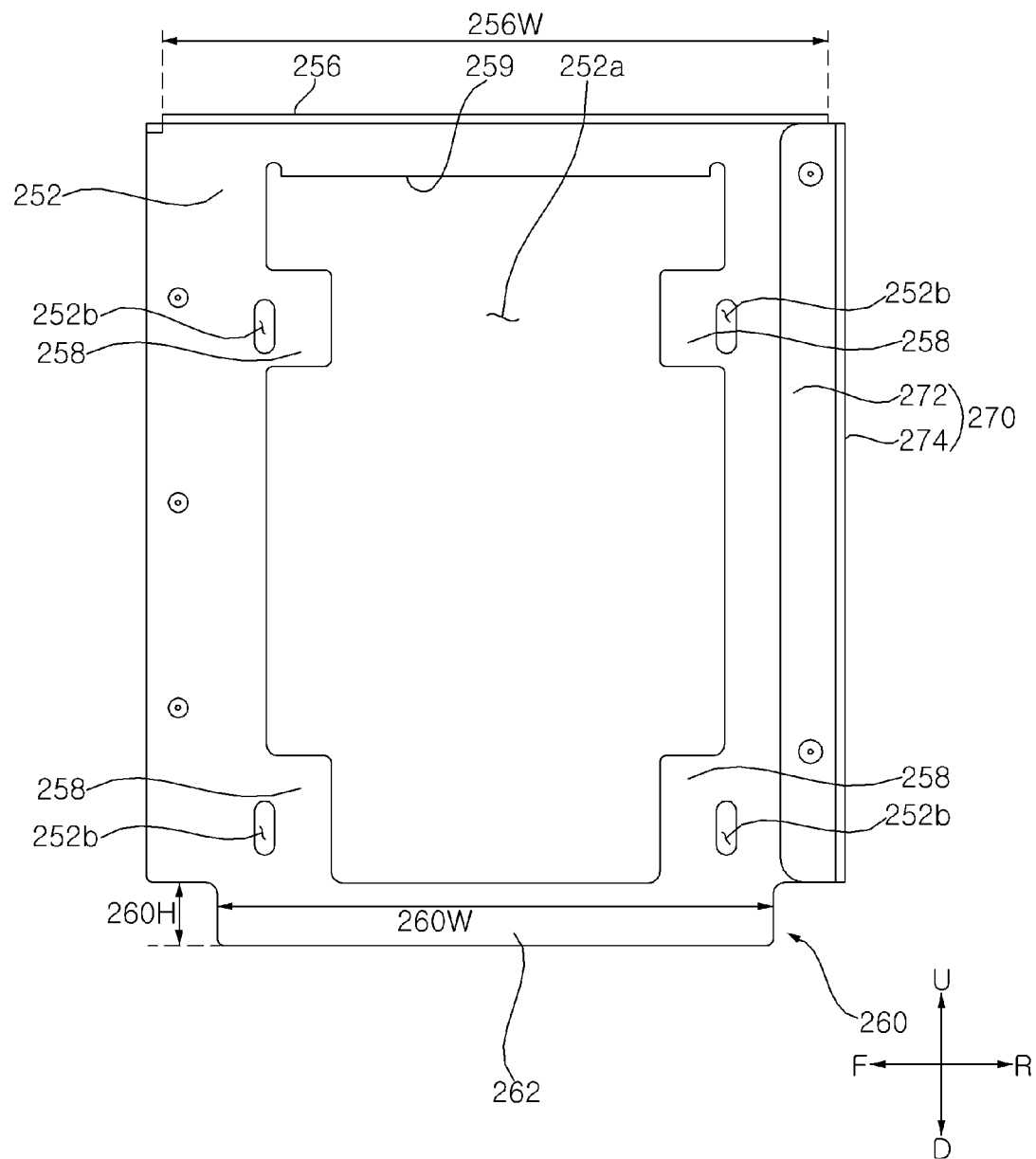
FIG. 22 is a front view of a side bracket according to an embodiment of the present disclosure.

Referring to FIG. 22, a width 260W of the shock absorbing portion 260 in which the shock absorbing portion 260 is formed in the front-rear direction is formed to be narrower than a width 256W of the bracket top wall 256 in which the bracket top wall 256 is formed in the front-rear direction. Other dimensions are within scope of the present invention.

A fixing bracket 270 for fixing the battery pack 10 to the casing 12 may be disposed in one side of the side bracket 250. The fixing bracket 270 may have a 'L' shape when viewed from the top. Other dimensions are within scope of the present invention.

The fixing bracket 270 includes a first fastening wall 272 fastened to the side bracket 250 and a second fastening wall 274 fastened to the casing 12. A fixing hole 276, 278 formed to be fastened to the casing 12 is formed in the second fastening wall 274. The fixing hole 276, 278 includes an upper fixing hole 276 disposed in an upper side and a lower fixing hole 278 disposed in a lower side of the upper fixing hole 276. One of the upper fixing hole 276 and the lower fixing hole 278 may be formed to be long in the vertical direction. Referring to FIG. 21, the upper fixing hole 276 is formed longer in the vertical direction than the lower fixing hole 278.

Figure 23:
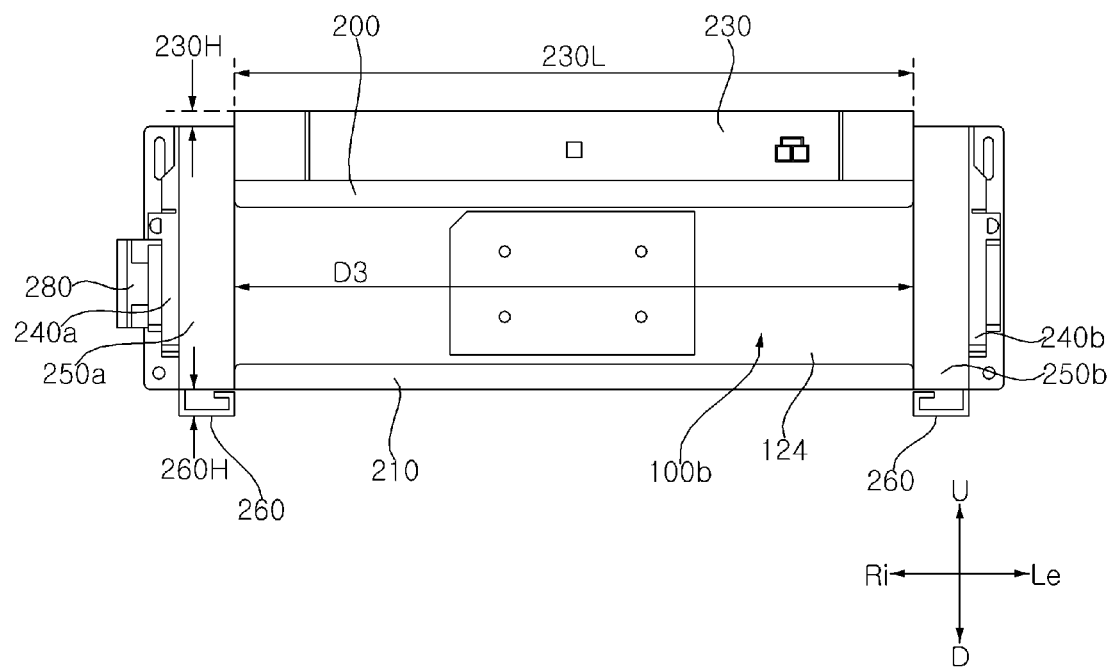
FIG. 23 is a front view of a battery pack according to an embodiment of the present disclosure.
Figure 24:
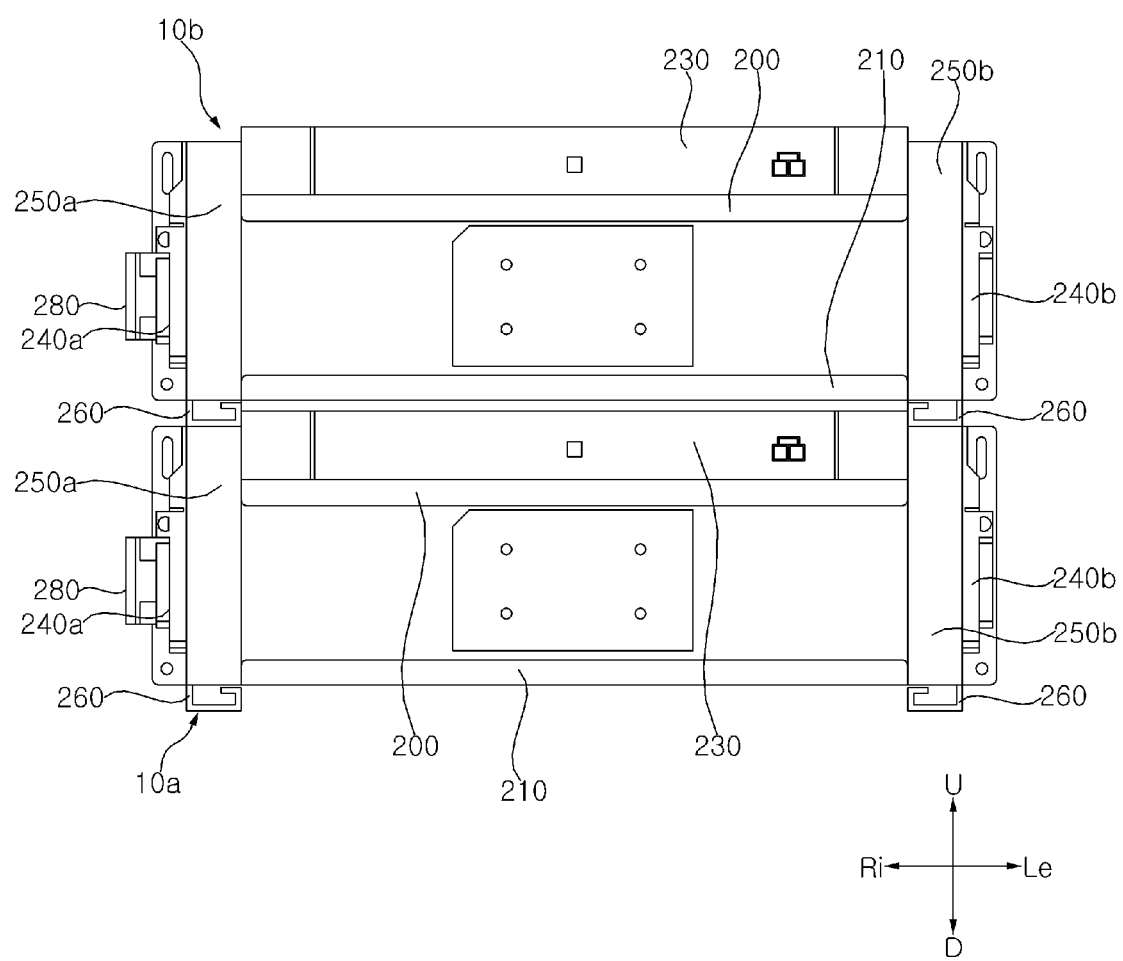
FIG. 24 is a front view of a state in which a battery pack is vertically disposed according to an embodiment of the present disclosure.

Hereinafter, the disposition of the side bracket 250 disposed in the battery pack 10 will be described with reference to FIGS. 23 and 24.

The pair of side brackets 250a and 250b are disposed to protrude above and below the upper or lower end of the battery module 100a, 100b to prevent an external shock from being directly transmitted to the battery cell 101. A pair of side brackets 250a and 250b may be disposed in both ends of the battery module 100a, 100b. An upper end of each of the pair of side brackets 250a and 250b is disposed above the upper board 202 of the upper fixing bracket 200. The upper end of each of the pair of side brackets 250a and 250b is disposed higher than the upper end of the battery module 100a, 100b. The upper end of each of the pair of side brackets 250a and 250b is disposed lower than the upper end of the top cover 230.

The lower end of the pair of side brackets 250a and 250b is disposed lower than the lower end of the battery module 100a, 100b. The pair of side brackets 250a and 250b are disposed to protrude downward than the battery module 100a, 100b. The shock absorbing portion 260 of each of the pair of side brackets 250a and 250b is disposed below the battery module 100a, 100b.

The second horizontal plate 268 of the shock absorbing portion 260 may be disposed to face the lower surfaces of the battery module 100a, 100b. The second horizontal plate 268 may be spaced apart from the lower surface of the battery module 100a, 100b. That is, a gap may be formed between the second horizontal plate 268 and the battery module 100a, 100b.

A height 260H at which the shock absorbing portion 260 protrudes downward from the battery module 100a, 100b may be formed to be longer than a height 230H at which the top cover 230 protrudes from the upper end of the side cover 240. Other dimensions are within scope of the present invention. Accordingly, when two or more battery packs 10a and 10b are disposed in the vertical direction, the side brackets 250 disposed in the vertical direction are in contact with each other, and the battery module 100a, 100b and the top cover 230 are spaced apart from each other. Referring to FIG. 24, when the two battery packs 10 are disposed in the vertical direction, the lower end of the side bracket 250 disposed in the upper side and the upper side of the side bracket 250 disposed in the lower side are in contact with each other. In this case, the top cover 230 of the battery pack 10 disposed in the lower side and the lower end of the battery module 100 of the battery pack 10 disposed in the upper side are disposed not to be in contact with each other. In this structure, even if the plurality of battery packs 10 disposed in the vertical direction fall, the battery module 100a, 100b disposed between the pair of side brackets 250a and 250b can be protected.

A distance D3 between the pair of side brackets 250a and 250b is formed to be greater than or equal to a length 230L of the top cover 230 extending in the left-right direction. Therefore, when disposing the other battery pack 10 on top of one battery pack 10, it is easy to adjust it to the same position.

<Energy Storage System>

Figure 25:
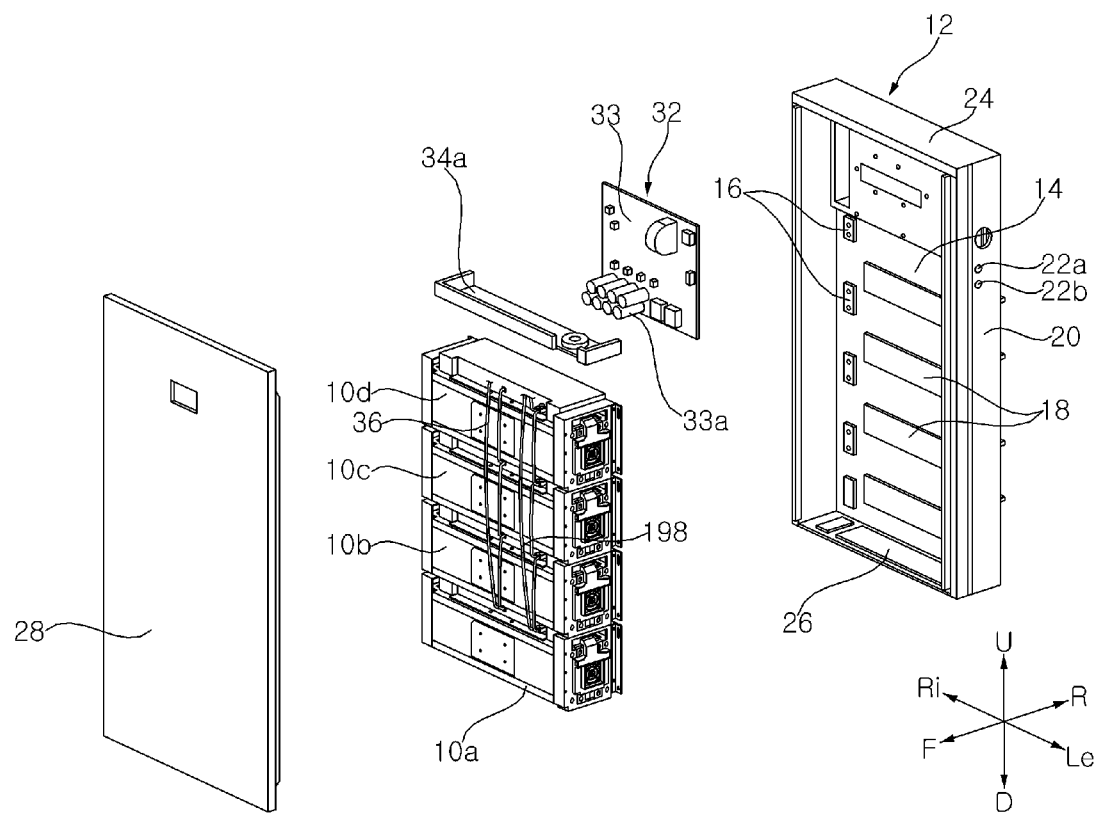
FIG. 25 is an exploded perspective view of an energy storage system including a plurality of battery packs according to an embodiment of the present disclosure.
Figure 26:
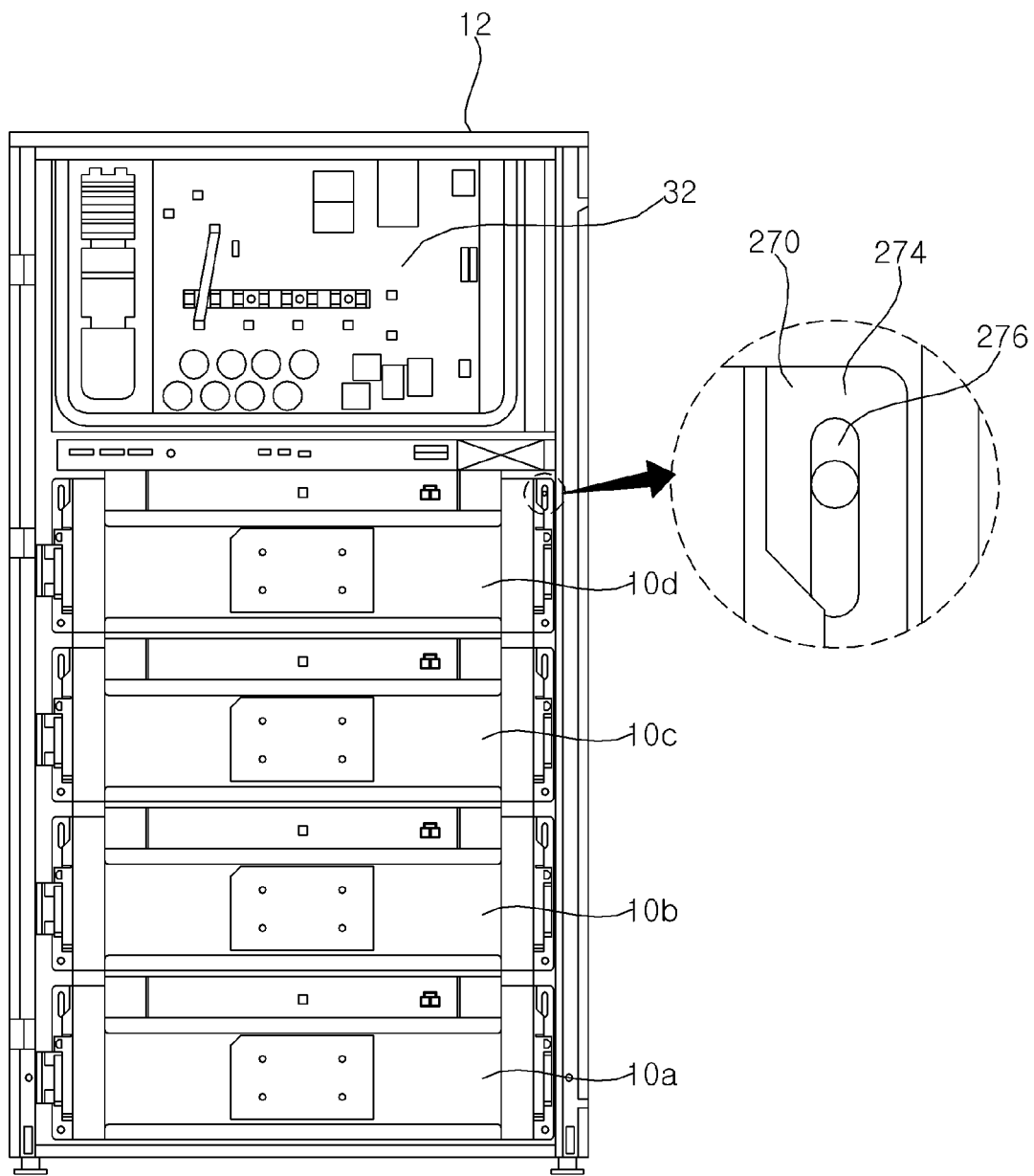
FIG. 26 is a front view of an energy storage system in a state in which a door is removed.
Figure 27:
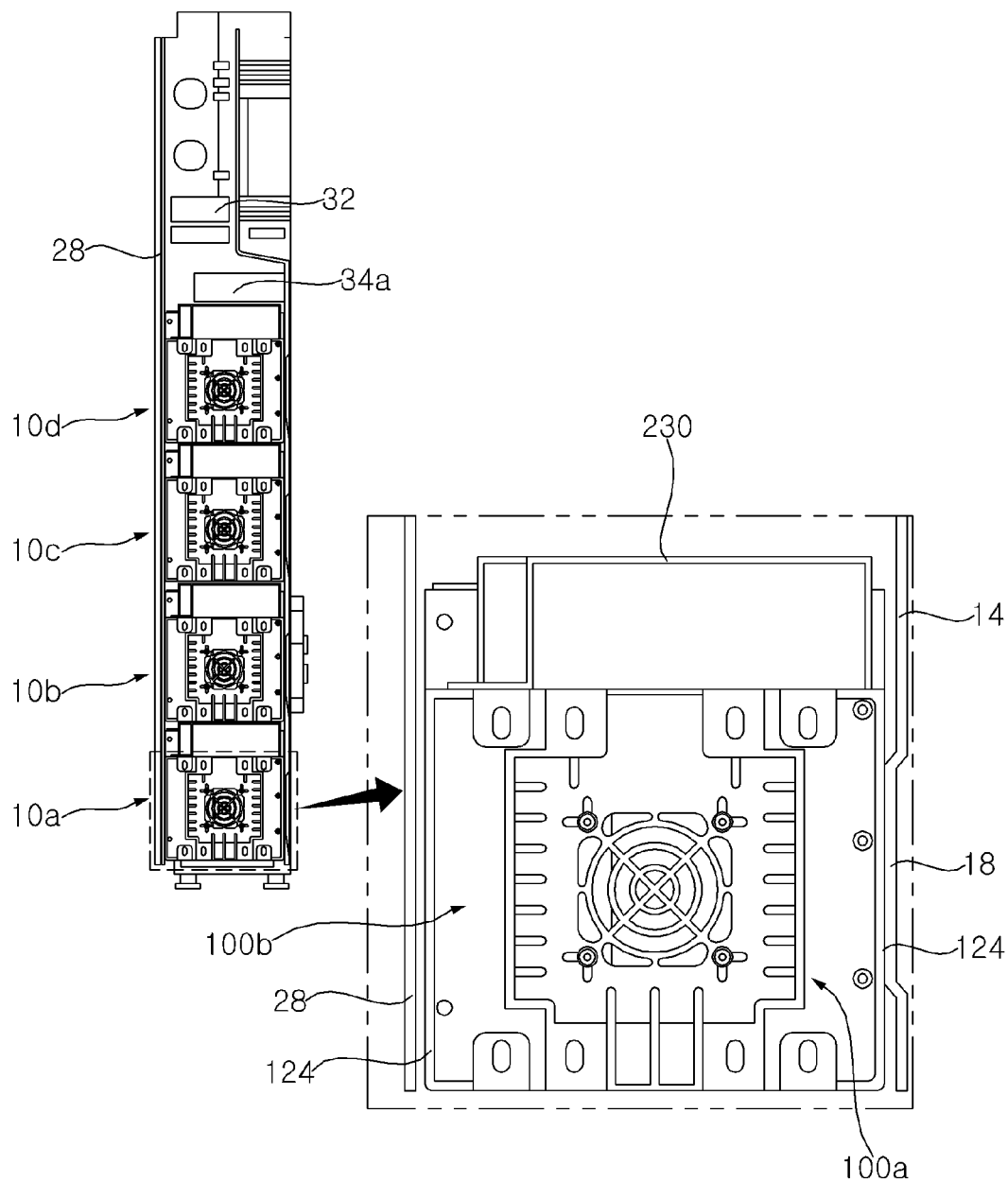
FIG. 27 is a cross-sectional view of one side of FIG. 26.

The energy storage system 1 of the present disclosure will be described with reference to FIGS. 25 to 27. Referring to FIG. 25, the energy storage system 1 includes at least one battery pack 10, a casing 12 forming a space in which at least one battery pack 10 is disposed, a door 28 for opening and closing the front surface of the casing 12, a power conditioning system 32 (PCS) which is disposed inside the casing 12 and converts the characteristics of electricity so as to charge or discharge a battery, and a battery monitoring system (BMS) that monitors information such as current, voltage, and temperature of the battery cell 101.

The casing 12 may have an open front shape. The casing 12 may include a casing rear wall 14 covering the rear, a pair of casing side walls 20 extending to the front from both side ends of the casing rear wall 14, a casing top wall 24 extending to the front from the upper end of the casing rear wall 14, and a casing base 26 extending to the front from the lower end of the casing rear wall 14. The casing rear wall 14 includes a pack fastening portion 16 formed to be fastened with the battery pack 10 and a contact plate 18 protruding to the front to contact the heat dissipation plate 124 of the battery pack 10.

Referring to FIG. 25, the contact plate 18 may be disposed to protrude to the front from the casing rear wall 14. The contact plate 18 may be disposed to contact one side of the heat dissipation plate 124. Accordingly, heat emitted from the plurality of battery cells 101 disposed inside the battery pack 10 may be radiated to the outside through the heat dissipation plate 124 and the contact plate 18.

A switch 22a, 22b for turning on/off the power of the energy storage system 1 may be disposed in one of the pair of casing sidewalls 20. In the present disclosure, a first switch 22a and a second switch 22b are disposed to enhance the safety of the power supply or the safety of the operation of the energy storage system 1.

The PCS 32 may include a circuit substrate 33 and an insulated gate bipolar transistor (IGBT) that is disposed in one side of the circuit substrate 33 and performs power conversion. Other forms of power conversion are within scope of the present invention.

The battery monitoring system may include a battery pack circuit substrate 220 disposed in each of the plurality of battery packs 10a, 10b, 10c, 10d, and a main circuit substrate 34a which is disposed inside the casing 12 and connected to a plurality of battery pack circuit substrates 220 through a communication line 36. The main circuit substrate 34a may be connected to the battery pack circuit substrate 220 disposed in each of the plurality of battery packs 10a, 10b, 10c, and 10d by the communication line 36. The main circuit substrate 34a may be connected to a power line 198 extending from the battery pack 10.

At least one battery pack 10a, 10b, 10c, and 10d may be disposed inside the casing 12. A plurality of battery packs 10a, 10b, 10c, and 10d are disposed inside the casing 12. The plurality of battery packs 10a, 10b, 10c, and 10d may be disposed in the vertical direction.

The plurality of battery packs 10a, 10b, 10c, and 10d may be disposed such that the upper end and lower end of each side bracket 250 contact each other. At this time, each of the battery packs 10a, 10b, 10c, and 10d disposed vertically is disposed such that the battery module 100a, 100b and the top cover 230 do not contact each other.

Each of the plurality of battery packs 10 is fixedly disposed in the casing 12. Each of the plurality of battery packs 10a, 10b, 10c, and 10d is fastened to the pack fastening portion 16 disposed in the casing rear wall 14. That is, the fixing bracket 270 of each of the plurality of battery packs 10a, 10b, 10c, and 10d is fastened to the pack fastening portion 16. The pack fastening portion 16 may be disposed to protrude to the front from the casing rear wall 14 like the contact plate 18.

The contact plate 18 may be disposed to protrude to the front from the casing rear wall 14. Accordingly, the contact plate 18 may be disposed to be in contact with one heat dissipation plate 124 included in the battery pack 10.

One battery pack 10 includes two battery modules 100a and 100b. Accordingly, two heat dissipation plates 124 are disposed in one battery pack 10. One heat dissipation plate 124 included in the battery pack 10 is disposed to face the casing rear wall 14, and the other heat dissipation plate 124 is disposed to face the door 28.

One heat dissipation plate 124 is disposed to contact the contact plate 18 disposed in the casing rear wall 14, and the other heat dissipation plate 124 is disposed to be spaced apart from the door 28. The other heat dissipation plate 124 may be cooled by air flowing inside the casing 12.

Another Embodiment

Figure 28:
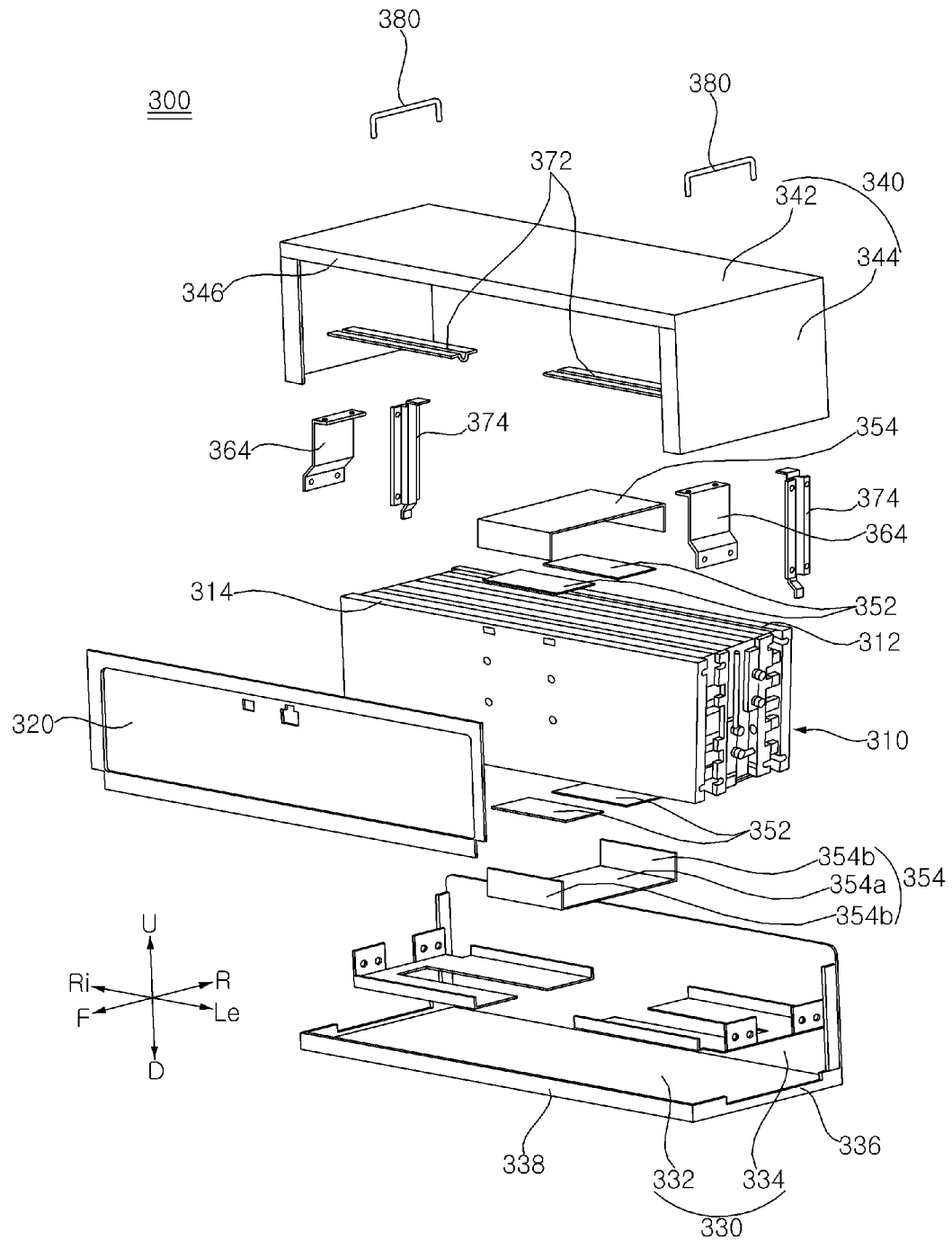
FIG. 28 is an exploded perspective view of a battery pack structure according to another embodiment of the present disclosure.

Hereinafter, a battery pack according to another embodiment of the present disclosure will be described with reference to FIG. 28. Referring to FIG. 28, a structure of the battery pack according to another embodiment of the present disclosure may include the first battery module and the second battery module described with reference to FIGS. 3 to 11B. Accordingly, each of the first battery module 312 and the second battery module 314 illustrated in FIG. 28 includes a plurality of battery cells 101 described with reference to FIGS. 3 to 11B, a first frame 110 for fixing one side of the plurality of battery cells, and a second frame 130 for fixing the other side of the plurality of battery cells.

Referring to FIG. 28, the battery pack 300 includes a battery module assembly 310 in which a first battery module and a second battery module are coupled, a front cover 320 that covers the front of the battery module assembly 310, a bottom cover 330 disposed in the lower side of the battery module assembly 310, an upper cover 340 disposed in the upper side of the battery module assembly 310, a module bracket 352, 354 for coupling the structure of the battery module assembly 310, and a cover bracket 362, 364 for coupling the battery module assembly 310 to the upper cover 340 or the bottom cover 330.

The battery pack 300 includes a guide bracket 372, 374 which is mounted in the upper cover 340, and guides the upper cover 340 to a position where it is fastened to the bottom cover 330. The guide bracket 372, 374 may be inserted into one side of the battery module assembly 310 to guide the position of the upper cover 340.

The battery pack 300 includes a pair of handles 380 coupled to the upper side of the upper cover 340. A pair of handles 380 are spaced apart from each other in the left-right direction.

The bottom cover 330 includes a base panel 332 covering the lower side of the battery module assembly 310 and a rear panel 334 covering the rear of the battery module assembly 310. A first fastening rib 336 bent to be fastened to a pair of side panels 344 described below is disposed in both ends of the base panel 332 and the rear panel 334, and a second fastening rib 338 bent to be fastened to the front cover is disposed in the front end of the base panel 332.

The upper cover 340 includes a top panel 342 covering the upper side of the battery module assembly 310 and a pair of side panels 344 covering both sides of the battery module assembly 310. A third fastening rib 346 bent to be fastened to the front panel 320 is disposed in the front end of the top panel 342 and the pair of side panels 344.

The module bracket 352, 354 includes a frame fixing plate 352 for fastening a first frame and a second frame included in each of the first battery module 312 and the second battery module 314, and a module fixing plate 354 for fastening the first battery module 312 and the second battery module 314.

The module fixing plate 354 is disposed in the outside of the frame fixing plate 352, and is fixedly disposed in each of the first battery module 312 and the second battery module 314. The module fixing plate 354 includes a main panel 354a disposed in the upper or lower side of the battery module assembly 310, and an end panel 354b which is bent at both ends of the main panel 354a and contacts the front and rear surfaces of the battery module assembly 310.

Each of the frame fixing plate 352 and the module fixing plate 354 may be disposed in the upper side and lower side of the battery module assembly 310.

The cover brackets 362, 364 includes a base bracket 362 for fixing the battery module assembly 310 to the bottom cover 330, and a side bracket 364 for fixing the battery module assembly 310 to a pair of side panels 344.

The guide bracket 372, 374 includes a first guide bracket 372 mounted in the top panel 342 and a second guide bracket 374 mounted in each of the pair of side panels 344.

According to the energy storage system of the present disclosure, there are one or more of the following effects.

First, there is an advantage in that the coupling force between the first battery module and the second battery module can be strengthened, by coupling the first battery module and the second battery module through a plurality of structures such as a module screw, an upper fixing bracket, a lower fixing bracket, a side cover, and a side bracket.

Second, the first battery module and the second battery module may be disposed to face each other, the battery cells may be electrically connected in a facing area, and heat generated from the battery cell to a non-facing area may be radiated to the outside. This has an advantage in that the number of battery cells disposed in the battery pack can be increased.

Third, there is an advantage in that the connection relationship between the battery cells disposed in the battery module can be stably maintained by concentrating the external impact on the side bracket through the side bracket.

While the present invention has been particularly shown and described with reference to exemplary embodiments thereof, it will be understood by those of ordinary skill in the art that various changes in form and detail may be made herein without departing from the spirit and scope of the present invention as defined by the following claims and such modifications and variations should not be understood individually from the technical idea or aspect of the present invention.

What is claimed is:

1. An energy storage system comprising:
a first battery module in which a plurality of battery cells are disposed;
a second battery module in which a plurality of battery cells are disposed, and which is disposed to face the first battery module;
a module screw which extends in a front-rear direction in which the first battery module and the second battery module are disposed, and fastens the first battery module and the second battery module;
an upper fixing bracket which is disposed in an upper side of the first battery module and the second battery module, and fixes the first battery module and the second battery module;
a lower fixing bracket which is disposed in a lower side of the first battery module and the second battery module, and fixes the first battery module and the second battery module;
an insulating plate disposed between the first battery module and the second battery module; and
a pair of side brackets which are disposed in both sides of the first battery module and the second battery module, and fix a disposition of the first battery module and the second battery module,
wherein the first battery module and the second battery module are symmetrically disposed with respect to the insulating plate,
wherein a high current bus bar is disposed on one side of each of the first battery module and the second battery module to electrically connect the first battery module and the second battery module,
wherein each of the pair of side brackets forms a space in which a portion of each of the first battery module and the second battery module is accommodated, and
wherein each of the upper fixing bracket and the lower fixing bracket includes a mounter that is bent at both side ends and fastened to each of the pair of side brackets.

2. The energy storage system of claim 1, wherein each of the upper fixing bracket and the lower fixing bracket is fastened to each of the first battery module and the second battery module, and the module screw is fastened to each of the first battery module and the second battery module between the upper fixing bracket and the lower fixing bracket.

3. The energy storage system of claim 1, wherein each of the first battery module and the second battery module comprises:
the plurality of battery cells;
a first frame for fixing one side of each of the plurality of battery cells; and
a second frame for fixing the other side of each of the plurality of battery cells,
wherein the first frame of each of the first battery module and the second battery module is spaced farther from the insulating plate than the second frame of each of the first battery module and the second battery module,
wherein a plurality of bus bars for connecting each of the plurality of battery cells in series or in parallel are disposed in the second frame.

4. The energy storage system of claim 3, wherein the module screw connects the first frame of the first battery module and the first frame of the second battery module.

5. The energy storage system of claim 3, wherein the first frame included in each of the first battery module and the second battery module comprises a first fastening protrusion protruding in a direction of the second frame disposed adjacently, and
the second frame included in each of the first battery module and the second battery module comprises a second fastening protrusion protruding in a direction of the first frame disposed adjacently,
wherein the first fastening protrusion and the second fastening protrusion are fixed by a frame screw.

6. The energy storage system of claim 3, wherein the first frame and the second frame each comprises a respective module fastening protrusion to which the module screw is coupled, and
the second frame comprises a support protrusion for supporting the module screw,
wherein one side of the module screw is fixed to the module fastening protrusion of the first battery module and the other side of the module screw is fixed to the module fastening protrusion of the second battery module.

7. The energy storage system of claim 6, wherein the module screw comprises:
a screw header fixed to one of the first battery module and the second battery module;
a screw fastening portion fixed to the other one of the first battery module and the second battery module; and
a screw support connecting the screw header and the screw fastening portion,
wherein the screw support passes through the support protrusion of the second frame.

8. The energy storage system of claim 3, wherein each of the upper fixing bracket and the lower fixing bracket is fastened to each of the first frame of the first battery module and the first frame of the second battery module.

9. The energy storage system of claim 3, wherein the upper fixing bracket comprises:
an upper board disposed in an upper side of the first battery module and the second battery module;
a pair of upper holders extending downward from front and rear end portions of the upper board; and
a pair of upper mounters which protrude downward from left and right end portions of the upper board, and are coupled to one side of each of the first battery module and the second battery module, wherein the lower fixing bracket comprises:
a lower board disposed in a lower side of the first battery module and the second battery module;
a pair of lower holders extending upwardly from front and rear end portions of the lower board; and
a pair of lower mounters which protrude upward from left and right end portions of the lower board, and are coupled to one side of each of the first battery module and the second battery module,
wherein the pair of upper mounters and the pair of lower mounters are respectively fastened to each of the first frame of the first battery module and the first frame of the second battery module.

10. The energy storage system of claim 3, wherein a plate groove through which the module screw passes is formed in the insulating plate.

11. The energy storage system of claim 3, further comprising a pair of side covers which are disposed in both sides of the first battery module and the second battery module, and have a cooling hole formed therein,
wherein each of the pair of side covers is fastened to each of the second frame of the first battery module and the second frame of the second battery module.

12. The energy storage system of claim 11, wherein a cooling fan for forming an air flow into the first battery module and the second battery module is disposed in one of the pair of side covers.

13. The energy storage system of claim 11,
wherein each of the pair of side brackets is fastened to each of the first frame of the first battery module and the first frame of the second battery module.

14. The energy storage system of claim 13, wherein each of the pair of side brackets comprises:
a bracket body having an opening hole formed inside;
a pair of bracket sidewalls protruding from both sides of the bracket body toward the first battery module or the second battery module;
a bracket top wall protruding from an upper side of the bracket body toward the first battery module or the second battery module; and
a shock absorbing portion which is disposed in a lower side of the bracket body, and protrudes to a lower side than the first battery module or the second battery module.

15. The energy storage system of claim 14, wherein the opening hole is formed to be larger than the side cover.

16. The energy storage system of claim 13, wherein each of the pair of side brackets protrudes to an upper side and a lower side than the first battery module or the second battery module.

17. The energy storage system of claim 13, further comprising a top cover which is disposed in an upper side of the upper fixing bracket, and forms a space inside,
wherein the top cover is disposed between the pair of side brackets, and disposed to protrude to an upper side than the pair of side brackets.

18. The energy storage system of claim 17, wherein a height at which the pair of side brackets protrude downward from the first battery module or the second battery module is formed to be longer than a height at which the top cover protrudes from an upper end of the side cover.

19. An energy storage system comprising:
a first battery module in which a plurality of battery cells are disposed;
a second battery module in which a plurality of battery cells are disposed, and which is disposed to face the first battery module;
a module screw which extends in a front-rear direction in which the first battery module and the second battery module are disposed, and fastens the first battery module and the second battery module;
an upper fixing bracket which is disposed in an upper side of the first battery module and the second battery module, and fixes the first battery module and the second battery module;
a lower fixing bracket which is disposed in a lower side of the first battery module and the second battery module, and fixes the first battery module and the second battery module; and
an insulating plate disposed between the first battery module and the second battery module,
wherein the first battery module and the second battery module are symmetrically disposed with respect to the insulating plate,
wherein a high current bus bar is disposed on one side of each of the first battery module and the second battery module to electrically connect the first battery module and the second battery module,
wherein each of the upper fixing bracket and the lower fixing bracket includes:
a board;
a first holder bent at a front end of the board and placed in contact with one of the first battery module and the second battery module;
a second holder bent at the rear end of the board and placed in contact with the other one of the first battery module and the second battery module;
a first upper mounter bent at one end of the board and coupled to one side of each of the first battery module and the second battery module; and
a second upper mounter bent at the other end of the board and coupled to the other side of each of the first battery module and the second battery module.

* * * * *